United States Patent
Sugai et al.

(10) Patent No.: US 10,407,263 B2
(45) Date of Patent: Sep. 10, 2019

(54) SHEET CONVEYING APPARATUS, IMAGE FORMING APPARATUS, METHOD FOR ESTIMATING BASIS WEIGHT OF SHEET, AND PROGRAM FOR ESTIMATING BASIS WEIGHT OF SHEET

(71) Applicant: KONICA MINOLTA, INC., Chiyoda-ku, Tokyo (JP)

(72) Inventors: Shun Sugai, Toyokawa (JP); Kazuhiko Kowase, Toyokawa (JP); Hideaki Komiyama, Ibaraki (JP); Mikiyuki Aoki, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/800,400

(22) Filed: Nov. 1, 2017

(65) Prior Publication Data
US 2018/0148288 A1    May 31, 2018

(30) Foreign Application Priority Data
Nov. 30, 2016  (JP) ................. 2016-232804

(51) Int. Cl.
*B65H 7/02*  (2006.01)
*G01B 7/06*  (2006.01)

(52) U.S. Cl.
CPC ............. *B65H 7/02* (2013.01); *G01B 7/087* (2013.01); *B65H 2220/03* (2013.01); *B65H 2301/50* (2013.01); *B65H 2511/13* (2013.01); *B65H 2515/112* (2013.01); *B65H 2515/712* (2013.01); *B65H 2553/23* (2013.01); *B65H 2801/06* (2013.01)

(58) Field of Classification Search
CPC ........ B65H 2553/232; B65H 2515/712; B65H 2511/13; B65H 2335/23; G01B 7/087
See application file for complete search history.

(56) References Cited

U.S. PATENT DOCUMENTS

| | | | | |
|---|---|---|---|---|
| 4,801,135 A | * | 1/1989 | Povio | B65H 1/18 271/155 |
| 5,168,239 A | * | 12/1992 | Winship | G01B 7/087 324/606 |
| 6,388,452 B1 | | 5/2002 | Picciotto | |
| 6,969,207 B2 | * | 11/2005 | Kahl | B41F 33/06 101/485 |

(Continued)

FOREIGN PATENT DOCUMENTS

| | | |
|---|---|---|
| JP | 05099605 A | 4/1993 |
| JP | 2002005610 A | 1/2002 |

(Continued)

*Primary Examiner* — Jeremy R Severson
(74) *Attorney, Agent, or Firm* — Holtz, Holtz & Volek PC

(57) ABSTRACT

A sheet conveying apparatus capable of conveying a sheet as a conveyance target in a conveyance path includes a detector that detects capacitance in a predetermined detection region in the conveyance path; and a basis weight identifier that identifies a basis weight of the sheet as the conveyance target on the basis of first capacitance detected by the detector while the sheet as the conveyance target does not pass through the detection region and second capacitance detected by the detector while the sheet as the conveyance target passes through the detection region.

21 Claims, 14 Drawing Sheets

(56) References Cited

U.S. PATENT DOCUMENTS

| | | | |
|---|---|---|---|
| 8,028,990 B2 * | 10/2011 | Miyamoto | B65H 7/02 |
| | | | 271/265.04 |
| 8,117,891 B2 * | 2/2012 | Graeffe | D21G 9/0009 |
| | | | 73/1.81 |
| 8,396,384 B2 | 3/2013 | Hayashihara et al. | |
| 9,429,513 B2 | 8/2016 | Adachi et al. | |
| 9,506,737 B2 * | 11/2016 | Jang | G01B 7/087 |
| 2017/0174457 A1 * | 6/2017 | Hirota | B65H 7/02 |

FOREIGN PATENT DOCUMENTS

| | | | |
|---|---|---|---|
| JP | 2006259589 A | 9/2006 |
| JP | 2007107976 A | 4/2007 |
| JP | 2010189137 A | 9/2010 |
| JP | 2014101214 A | 6/2014 |
| JP | 2015108611 A | 6/2015 |
| JP | 2015193473 A | 11/2015 |

\* cited by examiner

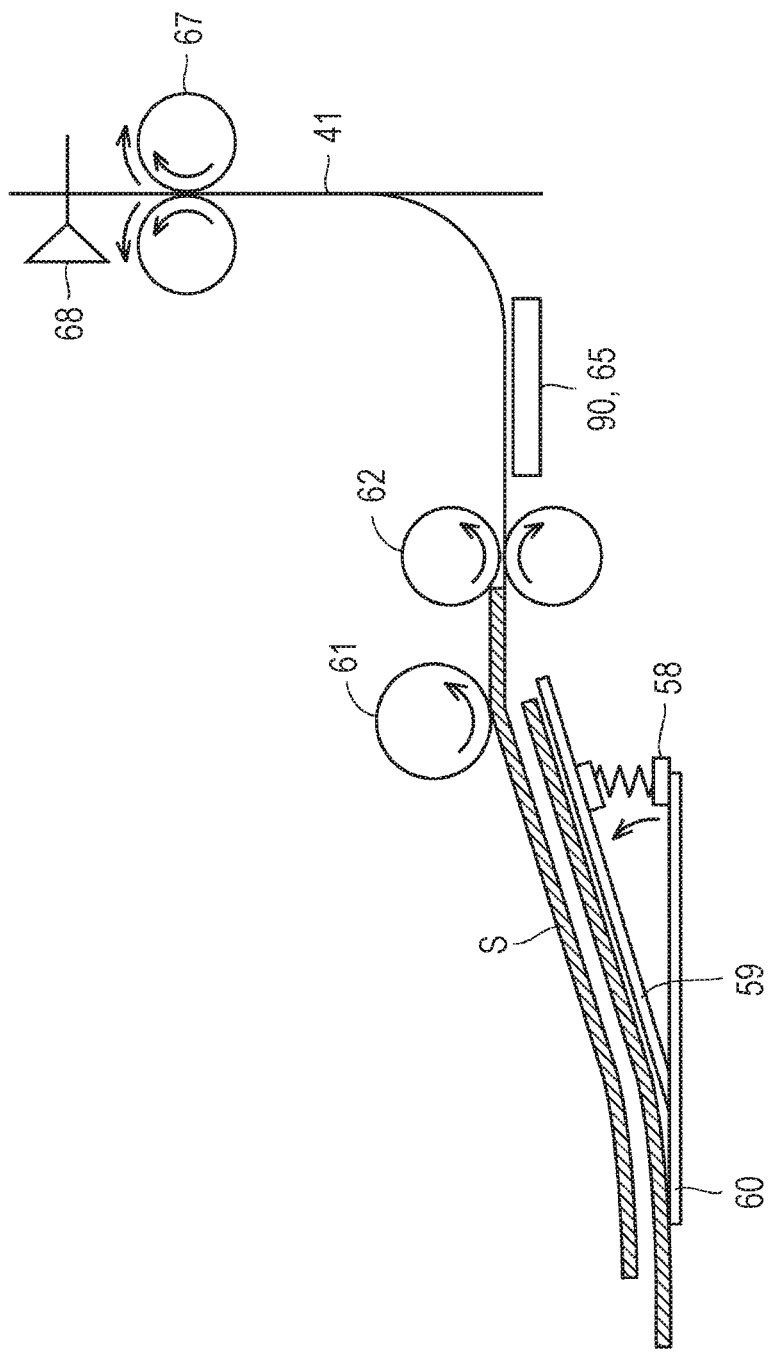

SHEET CONVEYING APPARATUS, IMAGE FORMING APPARATUS, METHOD FOR ESTIMATING BASIS WEIGHT OF SHEET, AND PROGRAM FOR ESTIMATING BASIS WEIGHT OF SHEET

Japanese Patent Application No. 2016-232804 filed on Nov. 30, 2016, including description, claims, drawings, and abstract the entire disclosure is incorporated herein by reference in its entirety.

BACKGROUND

Technological Field

The present disclosure relates to a technique for estimating the basis weight of a sheet being conveyed in an image forming apparatus.

Description of the Related Art

Image forming apparatuses such as multi-functional peripherals (MFPs) have been widely used. There are many types of sheets available for MFPs. To print appropriately irrespective of the sheet type, control parameters such as sheet feeding speed, transfer voltage, and fixing temperature are set in accordance with the sheet characteristics. Printing without appropriate settings of the sheet characteristics may deteriorate print quality and the like. As such, various techniques for accurately detecting the sheet characteristics have been developed.

In relation to this technique, JP 2007-107976 A discloses a sheet type detecting apparatus "capable of detecting the sheet type". JP 2002-5610 A discloses a thickness detecting apparatus that is "mechanically simple and inexpensive and capable of detecting the thickness of a medium irrespective of the dielectric or optical properties of the medium without the need for maintenance". JP 5-99605 A discloses a non-contact thickness detecting apparatus that "is not influenced by variation in a gap between a detection electrode connected to an electrostatic sensor and an object to be detected". JP 2015-193473 A discloses an apparatus for detecting the thickness of the sheet while "removing the influence of the eccentricity of a roller as much as possible". JP 2010-189137 A discloses an image forming apparatus "capable of determining the sheet type with the sheet stored in a sheet feed tray". JP 2006-259589 A discloses an image forming apparatus that "has solved implementation issues".

The basis weight of the sheet is an example of the sheet characteristics. The basis weight of the sheet represents the weight of the sheet per area. The unit of the basis weight of the sheet is expressed as "$g/m^2$". Since the basis weight of the sheet correlates with the thickness of the sheet, the basis weight of the sheet is used in the meaning similar to the thickness of the sheet.

The settings of the basis weight of the sheet influence the printing accuracy in particular. Printing without appropriate settings of the basis weight of the sheet may cause various issues such as jams, transfer failures, and fixing failures. Therefore, the basis weight of the sheet needs to be detected accurately. As a method for estimating the basis weight of the sheet, an estimation method using a capacitance sensor has been proposed. This estimation method is the application of the principle that the capacitance of the sheet correlates with the basis weight of the sheet.

The capacitance sensor is susceptible to the surrounding environment (e.g., temperature, humidity, and objects nearby). Accordingly, in a case where the basis weight of the sheet is estimated from the capacitance detected by the capacitance sensor, the estimation result of the basis weight varies depending on the surrounding environment. Detecting the basis weight of the sheet while reducing the influence of the surrounding environmental variations is not disclosed in JP 2007-107976 A, JP 2002-5610 A, JP 5-99605 A, JP 2015-193473 A, JP 2010-189137 A, or JP 2006-259589 A. Therefore, there is a need for a technique for accurately estimating the basis weight of the sheet irrespective of the surrounding environment.

SUMMARY

The present disclosure has been made to solve the issue as described above. An object of one aspect is to provide a sheet conveying apparatus that can accurately estimate the basis weight of a sheet irrespective of the surrounding environment. An object of another aspect is to provide an image forming apparatus that can accurately estimate the basis weight of a sheet irrespective of the surrounding environment. An object of another aspect is to provide an estimation method that can accurately estimate the basis weight of a sheet irrespective of the surrounding environment. An object of another aspect is to provide an estimation program that can accurately estimate the basis weight of a sheet irrespective of the surrounding environment.

To achieve at least one of the abovementioned objects, according to an aspect of the present invention, there is provided a sheet conveying apparatus capable of conveying a sheet as a conveyance target in a conveyance path, and the sheet conveying apparatus reflecting one aspect of the present invention comprises: a detector that detects capacitance in a predetermined detection region in the conveyance path; and a basis weight identifier that identifies a basis weight of the sheet as the conveyance target on the basis of first capacitance detected by the detector while the sheet as the conveyance target does not pass through the detection region and second capacitance detected by the detector while the sheet as the conveyance target passes through the detection region.

BRIEF DESCRIPTION OF THE DRAWING

The above and other objects, features, aspects, and advantages provided by one or more embodiments of the invention will become more fully understood from the detailed description given hereinbelow and the appended drawings which are given by way of illustration only, and thus are not intended as a definition of the limits of the present invention:

FIG. 6 is a view illustrating a configuration in the vicinity of storage for the sheet;

DETAILED DESCRIPTION OF EMBODIMENTS

Hereinafter, one or more embodiments of the present invention will be described with reference to the drawings. However, the scope of the invention is not limited to the disclosed embodiments. In the following description, the identical components and constituent elements are denoted with the identical reference signs. The names and functions thereof are also identical. Therefore, the detailed descriptions thereof will not be repeated. The embodiments and modifications described below may be selectively combined appropriately.

<First Embodiment>

[Image Forming Apparatus 100]

Figure 1:
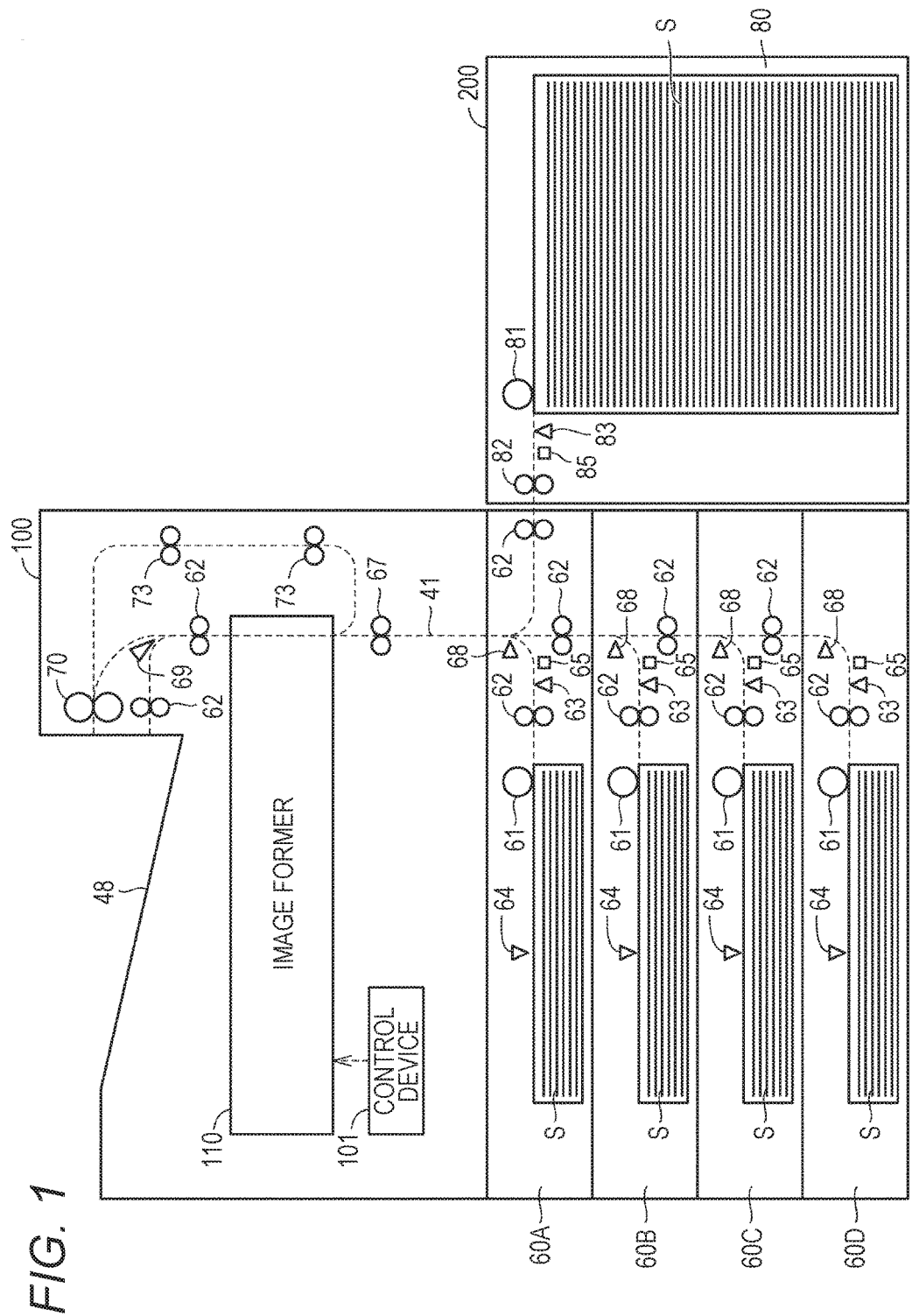
FIG. 1 is a view illustrating an exemplary internal structure of an image forming apparatus.

The following describes an image forming apparatus 100 with reference to FIG. 1. FIG. 1 is a view illustrating an exemplary internal structure of the image forming apparatus 100.

The image forming apparatus 100 may be a color printer, a monochrome printer, or facsimile, or may be a multi-function peripheral (i.e., MFP) including a monochrome printer, a color printer, and facsimile.

The image forming apparatus 100 includes storages 60A to 60D for sheets, sheet feeding rollers 61 serving as sheet feeders, conveying rollers 62 and 73 for the sheets, sheet sensors 63 and 64, capacitance detectors 65, timing rollers 67, timing sensors 68, a switching claw 69, inverting rollers 70, a control device 101, and an image former 110. The sheet feeding rollers 61, the sheet sensors 63, the sheet sensors 64, the capacitance detectors 65, and the timing sensors 68 will also be representatively referred to as "sheet feeding roller 61", "sheet sensor 63", "sheet sensor 64", "capacitance detector 65", and "timing sensor 68", respectively. The control device 101 controls the image forming apparatus 100. The image former 110 prints a toner image on a sheet.

Each of the storages 60A to 60D is a cassette in which sheets are placed. In the following description, the storages 60A to 60D will also be referred to as a storage 60 representing one of the storages 60A to 60D. The storage 60 is detachable from the image forming apparatus 100. The user can place sheets S in the storage 60 after detaching the storage 60 from the image forming apparatus 100. The size of the stored sheets S may be different or the same among the storages 60A to 60D.

The sheet feeding roller 61 is connected to a motor (not illustrated) through a sheet feeding clutch (not illustrated). The motor is controlled by the control device 101. The control device 101 drives the motor in response to the reception of a print instruction from the user. By rotating the sheet feeding roller 61 via the sheet feeding clutch in this manner, the control device 101 sends the sheets S one by one from the storage 60 to a conveyance path 41.

The sheet S sent from the storage 60 is conveyed along the conveyance path 41 by the conveying rollers 62. The conveying rollers 62 are connected to the motor (not illustrated). The motor is controlled by the control device 101. The control device 101 rotates the conveying rollers 62 by driving this motor, thereby conveying the sheet S along the conveyance path 41.

During the conveyance, the sheet S passes over the sheet sensor 63 and the capacitance detector 65. The sheet sensor 63 is arranged such that its detection region includes the conveyance path 41, and detects that the sheet S passes through the detection region. The capacitance detector 65 (detector) is arranged such that its detection region includes the conveyance path 41, and detects the capacitance in the detection region. The details of the sheet sensor 63 and the capacitance detector 65 will be described later.

The sheet S that has passed over the sheet sensor 63 and the capacitance detector 65 is sent to the image former 110. The image former 110 forms a toner image on the basis of an image pattern to be printed, and prints the toner image on the sheet S. The timing at which the sheet S is sent to the image former 110 is adjusted by the timing rollers 67. More specifically, the timing rollers 67 adjust the conveyance of the sheet S on the basis of the sheet detection result of the timing sensor 68 so as to align with the position of the toner image being conveyed in the image former 110. With such a configuration, the toner image formed by the image former 110 is printed on the appropriate position of the sheet S.

In a case where the instruction that the image forming apparatus 100 receives is one-side printing, the control device 101 ejects the sheet S to a tray 48 by driving the switching claw 69. In a case where the instruction that the image forming apparatus 100 receives is duplex printing, the control device 101 sends the sheet S to the inverting rollers 70 by driving the switching claw 69. Thereafter, the sheet S is sent to the conveying rollers 73 and then passes through the image former 110 again. The toner image is printed on the back side of the sheet S, after which the sheet S is ejected to the tray 48.

The image forming apparatus 100 detachably includes a large-capacity sheet feeding apparatus 200 which serves as a large capacity tray (LCT). The sheet feeding apparatus 200 includes storage 80 for sheets, a sheet feeding roller 81 serving as a sheet feeder, conveying rollers 82 for the sheets, a sheet sensor 83, and a capacitance detector 85. The sheet feeding roller 81 functions similarly to the sheet feeding roller 61. The sheet sensor 83 functions similarly to the sheet sensor 63. The capacitance detector 85 functions similarly to the capacitance detector 65.

The storage 80 approximately stores hundreds to thousands of sheets S. When the sheet feeding apparatus 200 receives, from the image forming apparatus 100, an instruction to convey the sheets S stored in the storage 80, the sheet feeding apparatus 200 sends the sheets S one by one from the storage 80 by driving the sheet feeding roller 81. The sheet S sent from the storage 80 is conveyed by the conveying rollers 82, and sent to the conveyance path 41 of the image forming apparatus 100 after passing over the sheet sensor 83 and the capacitance detector 85. Thereafter, the printing processing is performed in a similar manner as above.

[Circuit Configuration of Capacitance Detector 65]

Figure 2:
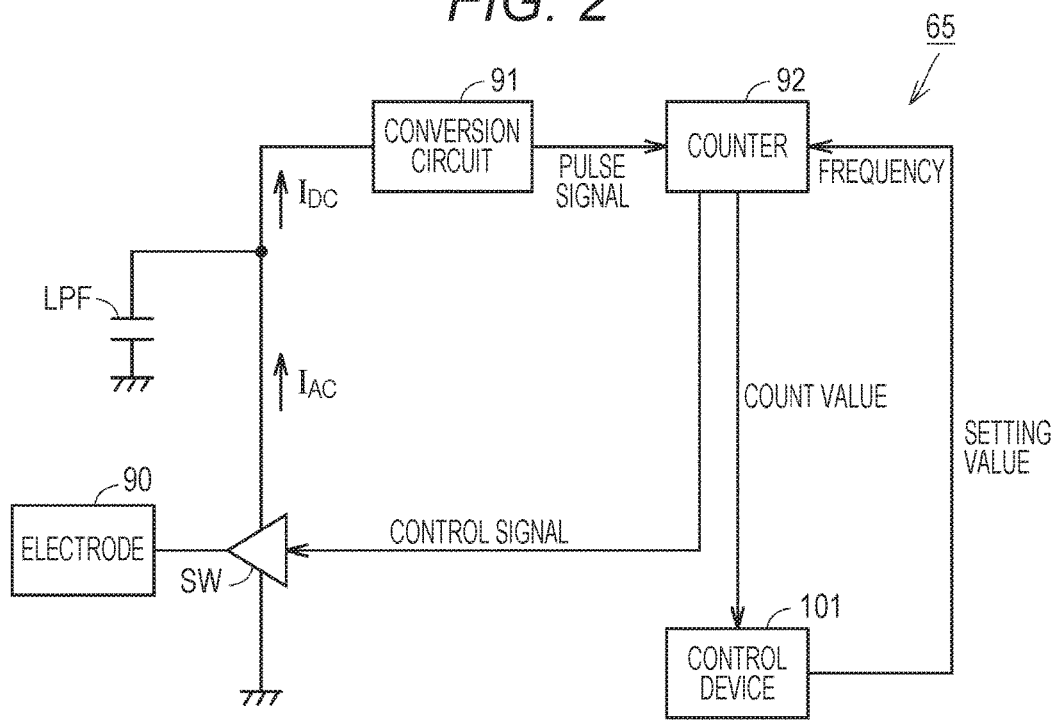
FIG. 2 is a diagram illustrating an exemplary circuit configuration of a capacitance detector.

The following describes the capacitance detector 65 with reference to FIG. 2. FIG. 2 is a diagram illustrating an exemplary circuit configuration of the capacitance detector 65.

The capacitance detector 65 includes an electrode 90, a conversion circuit 91, a counter 92, a switch SW, and a low-pass filter LPF.

The electrode 90 is electrically connected to the switch SW. The switch SW alternately switches between a conduction state and a non-conduction state in accordance with a control signal (e.g., a pulse signal) outputted from the counter 92. The counter 92 controls the frequency of the control signal in accordance with a setting value received from the control device 101. The conduction state and the non-conduction state of the switch SW are alternately switched by the control signal. As a result, charging and discharging of the electrode 90 are repeated, whereby an alternating current $I_{AC}$ is outputted from the electrode 90. The alternating current $I_{AC}$ is smoothed by the low-pass filter LPF and converted into a direct current $I_{DC}$. The direct current $I_{DC}$ is outputted to the conversion circuit 91.

The conversion circuit 91 generates a pulse signal having a frequency corresponding to the magnitude of the direct current $I_{DC}$. Typically, the larger the direct current $I_{DC}$, the higher the frequency of the pulse signal outputted from the conversion circuit 91. The pulse signal is outputted to the counter 92. The counter 92 counts the number of pulses of the pulse signal outputted from the conversion circuit 91 per predetermined period of time and sequentially outputs this count value to the control device 101.

As described in detail later, the electrode 90 is arranged along the conveyance path 41 for the sheet. As the sheet approaches the electrode 90, the capacitance in the detection region increases, and when the switch SW is in the conduction state, the current discharged from the electrode 90 becomes larger. As a result, the direct current $I_{DC}$ increases and the frequency of the pulse signal outputted from the conversion circuit 91 increases, whereby the count value outputted from the counter 92 increases. In this manner, the count value outputted from the counter 92 correlates with the magnitude of the capacitance in the detection region. At this time, the count value outputted from the counter 92 linearly changes with respect to the capacitance in the detection region. That is, the larger the count value outputted from the counter 92, the larger the capacitance in the detection region. In other words, the larger count value outputted from the counter 92 indicates that the sheet is present closer to the electrode 90.

The magnitude of the capacitance in the detection region may be represented by the count value outputted from the counter 92 or may be represented by another index correlated with the capacitance. Alternatively, the magnitude of the capacitance in the detection region may be represented by an average value of each count value outputted from the counter 92 during the predetermined period of time. The predetermined period of time is a period of time during which the detection value is stabilized and falls within a range that does not affect other control.

The circuit configuration of the capacitance detector 65 is not limited to the example illustrated in FIG. 2. As long as the count value outputted from the counter 92 linearly changes with respect to the capacitance in the detection region, the capacitance detector 65 may be implemented with another circuit configuration.

Furthermore, the capacitance detection method employed by the capacitance detector 65 is not necessarily limited to the above-described method. As an example, the capacitance may be detected on the basis of the following expression (1).

$$C = k \cdot A/d + Cp \quad (1)$$

"C" in the expression (1) represents the capacitance in the detection region. "k" in the expression (1) represents the permittivity of the sheet to be measured. "A" in the expression (1) represents the contact area between the electrode and the sheet to be measured. "d" in the expression (1) represents the distance between the electrode and the sheet to be measured. "Cp" in the expression (1) represents the parasitic capacitance.

[Basis Weight Detection Method]

Figure 3:
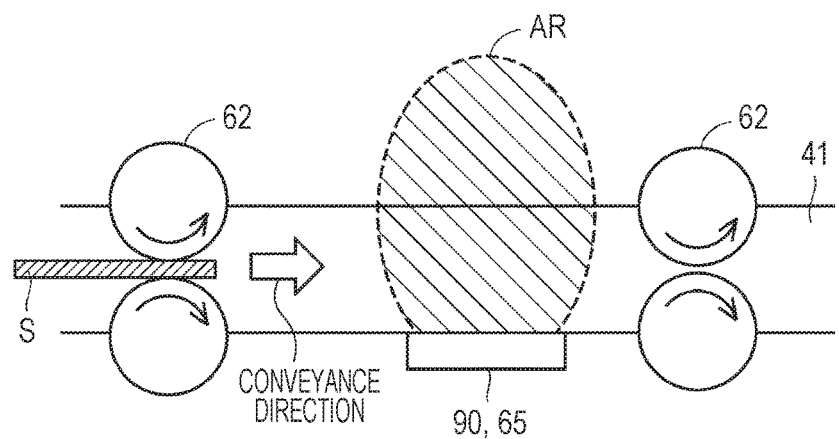
FIG. 3 is a view illustrating part of a conveyance path for a sheet.
Figure 4:
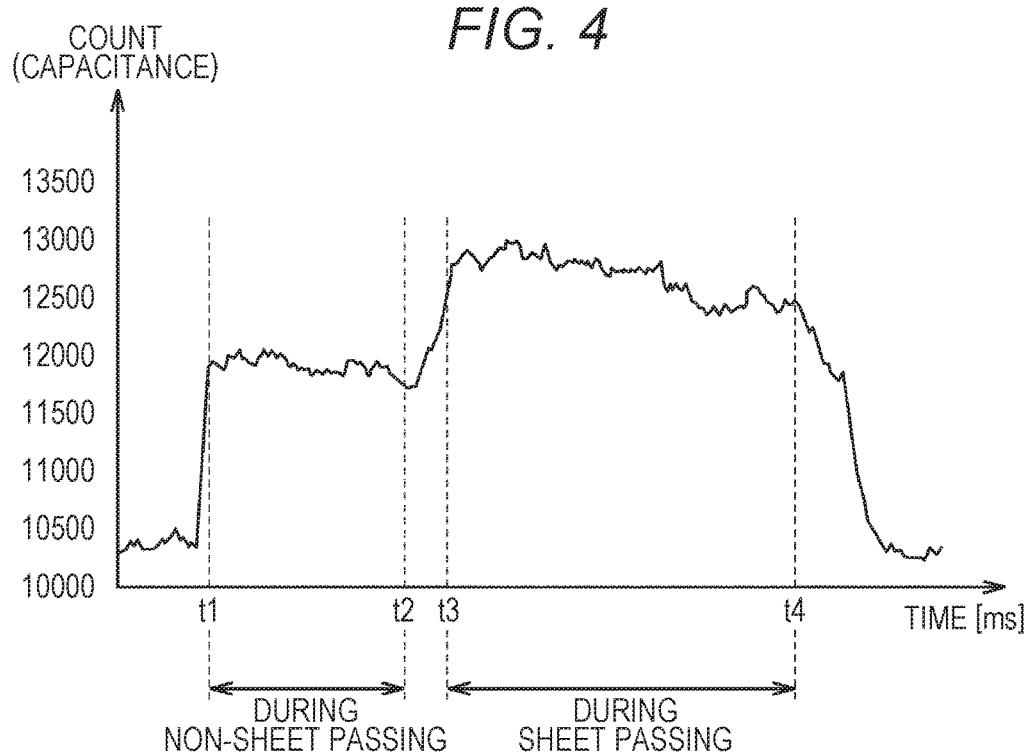
FIG. 4 is a graph illustrating an exemplary transition of capacitance detected by the capacitance detector.
Figure 5:
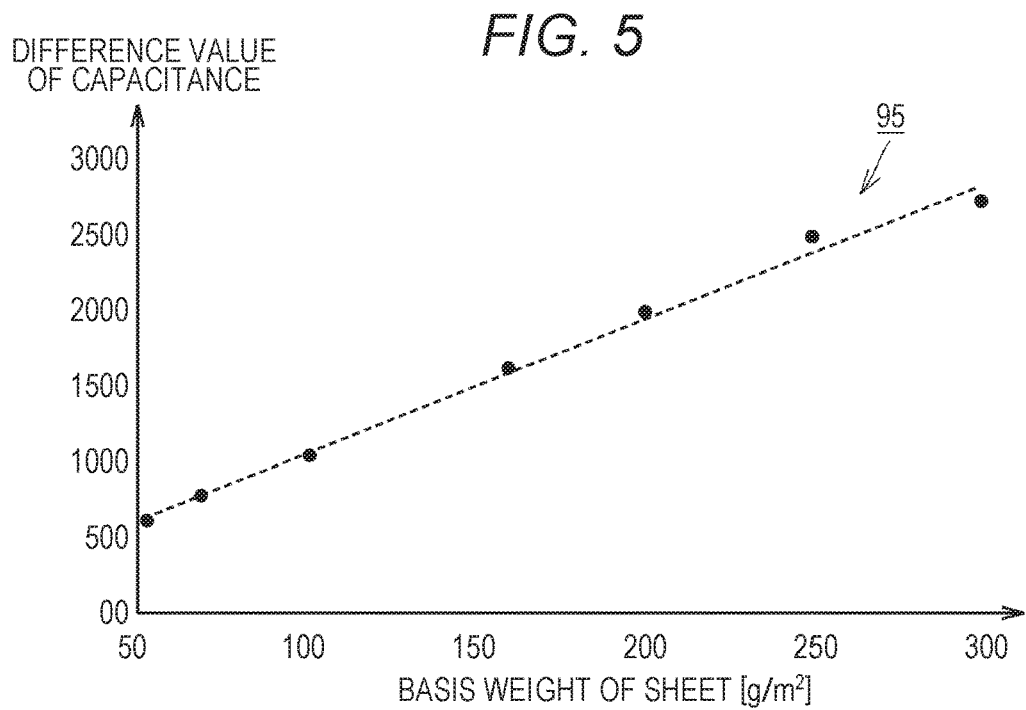
FIG. 5 is a graph illustrating a correlation between a value of difference between capacitance during non-sheet passing and capacitance during sheet passing and the basis weight of the sheet.

The following describes the method for detecting the basis weight of the sheet S with reference to FIGS. 3 to 5.

FIG. 3 is a view illustrating part of the conveyance path 41 for the sheet S. As described above, the capacitance detector 65 includes the electrode 90. The electrode 90 is arranged such that the surface thereof is parallel to the conveyance path 41 and does not contact the sheet S being conveyed. The capacitance detector 65 detects the capacitance in a detection region AR.

FIG. 4 is a graph illustrating an exemplary transition of the capacitance detected by the capacitance detector 65. The horizontal axis of the graph illustrated in FIG. 4 represents time. The vertical axis of the graph illustrated in FIG. 4 represents the count value (refer to FIG. 2) outputted from the capacitance detector 65. This count value correlates with the capacitance in the detection region AR.

The capacitance detected by the capacitance detector 65 differs between when the sheet S passes through the detection region AR and when the sheet S does not pass through the detection region AR. Hereinafter, the capacitance detected by the capacitance detector 65 while the sheet S as the conveyance target does not pass through the detection region AR will also be referred to as "capacitance during non-sheet passing" (first capacitance). In the example of FIG. 4, the capacitance detected during a period between time t1 and t2 is the "capacitance during non-sheet passing". In addition, the capacitance detected by the capacitance detector 65 while the sheet S as the conveyance target passes through the detection region AR will also be referred to as "capacitance during sheet passing" (second capacitance). In the example of FIG. 4, the capacitance detected during a period between time t3 and t4 is the "capacitance during sheet passing".

The capacitance to be detected is susceptible to the surrounding environment (e.g., temperature, humidity, and objects nearby). The capacitance during non-sheet passing includes the influence of such environmental variations. Attention is paid to this point, and the image forming apparatus 100 subtracts the capacitance during non-sheet passing from the capacitance during sheet passing. With such a configuration, the image forming apparatus 100 can detect the capacitance of the sheet with the influence of the environmental variations excluded from the capacitance during sheet passing.

The capacitance (third capacitance) acquired as the result of the difference correlates with the basis weight of the sheet. FIG. 5 is a graph illustrating a correlation 95 between the difference value and the basis weight of the sheet. The difference value is the value of difference between the capacitance during non-sheet passing and the capacitance during sheet passing. The correlation 95 preliminarily acquired by experiment, simulation, or the like is stored in a storage device 120 (refer to FIG. 8) of the image forming apparatus 100, for example. The correlation 95 may be represented as a table in which the basis weight of the sheet is associated with each capacitance of the sheet or may be represented as a relational expression in which the capacitance of the sheet serves as an explanatory variable and the basis weight of the sheet serves as an objective variable. The correlation 95 is defined such that the basis weight of the sheet increases as the difference value of the capacitance increases. That is, the correlation 95 is defined such that the basis weight of the sheet linearly changes with respect to the difference value of the capacitance. On the basis of the correlation 95, the image forming apparatus 100 identifies the basis weight corresponding to the result of the difference between the capacitance during non-sheet passing and the capacitance during sheet passing, and outputs this basis weight as the basis weight of the sheet S as the conveyance target.

As described above, the image forming apparatus 100 calculates the capacitance of the sheet S on the basis of the capacitance during sheet passing and the capacitance during non-sheet passing, and outputs, on the basis of the correlation 95, the basis weight corresponding to the calculated capacitance as the basis weight of the sheet S as the conveyance target. By using not only the capacitance during sheet passing but also the capacitance during non-sheet passing, the image forming apparatus 100 can reduce the influence of the surrounding environmental variations. This allows the image forming apparatus 100 to accurately estimate the basis weight of the sheet S irrespective of the surrounding environmental variations. With such a configuration, the image forming apparatus 100 can set control parameters (e.g., sheet feeding speed, transfer voltage, and fixing temperature) related to printing in accordance with the accurately estimated basis weight, thereby improving the printing accuracy.

A description has been given of the example where the influence of the environmental variations is reduced by subtracting the capacitance during non-sheet passing from the capacitance during sheet passing. However, the influence of the environmental variations may be reduced using other methods. For example, the image forming apparatus 100 may calculate a ratio of the capacitance during sheet passing to the capacitance during non-sheet passing to reduce the influence of the environmental variations. In this case, the image forming apparatus 100 divides the capacitance during non-sheet passing by the capacitance during sheet passing, and calculates the basis weight of the sheet S on the basis of this division result (ratio).

[Installation Position of Capacitance Detector 65]

The following describes the installation position of the capacitance detector 65 with reference to FIG. 6. FIG. 6 is a view illustrating a configuration in the vicinity of the storage 60 for the sheet S.

As described above, the capacitance used to detect the basis weight of the sheet S is detected by the capacitance detector 65. The basis weight is preferably detected at the earliest possible timing since the detected basis weight is fed back to the printing control. For this reason, the capacitance detector 65 is provided in the vicinity of the sheet feeding roller 61 which serves as a sheet feeding port for the sheet S. In other words, the capacitance detector 65 is provided within a predetermined range from the sheet feeding roller 61 (sheet feeder) for the sheet S. As a result, the image forming apparatus 100 can promptly detect the capacitance during sheet passing, thereby promptly calculating the basis weight of the sheet S.

The image forming apparatus 100 includes lifts 58 (also representatively referred to as "lift 58"). The sheet S stored in the storage 60 is lifted to the sheet feeding roller 61 and then guided to the conveyance path 41 by the lift 58. The lift 58 is provided in the vicinity of the sheet feeding port for the sheet S. As described above, the capacitance detector 65 is preferably provided in the vicinity of the sheet feeding port. In other words, the capacitance detector 65 is arranged within a range in which the detection result thereof is influenced by the guidance of the sheet S by the lift 58. This range is preliminarily acquired by experiment, simulation, or the like. With the lift 58 arranged within this range, the image forming apparatus 100 can promptly detect the capacitance during sheet passing, thereby promptly calculating the basis weight of the sheet S.

A description has been given of the example where the capacitance detector 65 is provided in the vicinity of the sheet feeding port for the sheet S. However, the capacitance detector 65 is not necessarily provided in the vicinity of the sheet feeding port for the sheet S. The capacitance detector 65 can be provided at any position along the conveyance path 41 for the sheet S.

[Detection Timing of Capacitance During Non-Sheet Passing]

The capacitance during non-sheet passing can be detected at various timings as long as the sheet S is not present in the detection region AR of the capacitance detector 65. The following describes concrete examples of the detection timing of the capacitance during non-sheet passing.

In one aspect, the capacitance during non-sheet passing is detected by the capacitance detector 65 during a period between after the conveyance of the sheet S as the conveyance target is started and before the sheet S reaches the detection region AR. With such a configuration, the capacitance detector 65 can detect the capacitance during non-sheet passing immediately before the detection timing of the capacitance during sheet passing. This configuration therefore reduces the difference between the environment at the detection timing of the capacitance during non-sheet passing and the environment at the detection timing of the capacitance during sheet passing. As a result, it is possible to reduce the influence of the environmental variations more assuredly.

Alternatively, the capacitance during non-sheet passing may be detected regularly during a period between after the conveyance of the sheet S as the conveyance target is started and before the leading end of the sheet S reaches the detection region AR. In this case, in a case where there is any change equal to or greater than a predetermined value in the capacitance during non-sheet passing, the image forming apparatus 100 stores the capacitance at this time and calculates the basis weight of the sheet S using this capacitance.

In another aspect, the capacitance during non-sheet passing is detected by the capacitance detector 65 at the timing when the conveyance of the sheet S as the conveyance target is started. By detecting the capacitance during non-sheet passing only at the timing when the conveyance of the sheet S is started, the burden of processing is reduced. Once the sheet feeding is started, the burden of processing increases. Therefore, being able to reduce the burden of processing after the sheet feeding is particularly effective.

In still another aspect, the capacitance during non-sheet passing is detected by the capacitance detector 65 during a period between after preparation processing for feeding the sheet S stored in the storage 60 to the conveyance path 41 is completed and before the sheet S reaches the detection region AR. The preparation processing is, for example, processing in which the lift 58 lifts the sheet S stored in the storage 60 to the sheet feeding roller 61. With such a configuration, the capacitance detector 65 can detect the capacitance during non-sheet passing immediately before the detection timing of the capacitance during sheet passing. As a result, the difference between the environment at the detection timing of the capacitance during non-sheet passing and the environment at the detection timing of the capacitance during sheet passing is reduced, whereby the influence of the environmental variations is reduced more assuredly.

In still another aspect, the capacitance during non-sheet passing is detected by the capacitance detector 65 on the basis of the reception of an instruction to feed the sheet S stored in the storage 60 to the conveyance path 41. With such a configuration, the capacitance detector 65 can detect the capacitance before the start of the conveyance of the sheet S. Therefore, it is possible to detect the capacitance while the sheet S is not present in the detection region AR. Preferably, the capacitance detector 65 detects the capacitance during non-sheet passing on the basis of the completion of the preparation processing for feeding the sheet S to the conveyance path 41 following the reception of the instruction to feed the sheet S.

In still another aspect, the capacitance during non-sheet passing is detected by the capacitance detector 65 on the basis of the sheet detection result of the sheet sensor 64 (refer to FIG. 1). The sheet sensor 64 is provided inside the storage 60 for the sheet S or in the vicinity of the storage 60 and detects the state in which the sheet S is placed in the storage 60. The capacitance during non-sheet passing is detected by the capacitance detector 65 during a period between after the sheet sensor 64 detects the state in which the sheet S is placed in the storage 60 and before the sheet S reaches the detection region AR. By the time the sheet S reaches the detection region AR, the capacitance detector 65 sequentially detects the capacitance during non-sheet passing, and in a case where there is any change equal to or greater than a predetermined value in the capacitance, the capacitance detector 65 stores the capacitance at this time as the capacitance during non-sheet passing.

In still another aspect, the capacitance during non-sheet passing is detected by the capacitance detector 65 at the timing when the image forming apparatus 100 is powered on. Since the sheet S is not being conveyed when the image forming apparatus 100 is powered on, the capacitance detector 65 can detect the capacitance while the sheet S is not present in the detection region AR.

Preferably, in a case where the attachment and detachment state of the storage 60 when the image forming apparatus 100 is powered on is different from the state during the preceding power-off, the capacitance detector 65 detects the capacitance during non-sheet passing. In a case where the attachment and detachment state of the storage 60 is changed, there is a high possibility that a new sheet S has been placed. By detecting the capacitance during non-sheet passing on the basis of the attachment and detachment state of the storage 60, the state of the sheet S at the detection timing of the capacitance during non-sheet passing and the state of the sheet S at the detection timing of the capacitance during sheet passing become the same, whereby the influence of the environmental variations is reduced more assuredly. Whether the storage 60 has been detached from the image forming apparatus 100 is determined on the basis of; for example, the capacitance detected by the capacitance detector 65. More specifically, in a case where the capacitance detected before the image forming apparatus 100 is powered off is different from the capacitance detected when the image forming apparatus 100 is powered on, the image forming apparatus 100 determines that the storage 60 has been pulled out during power-off.

Figure 7A:
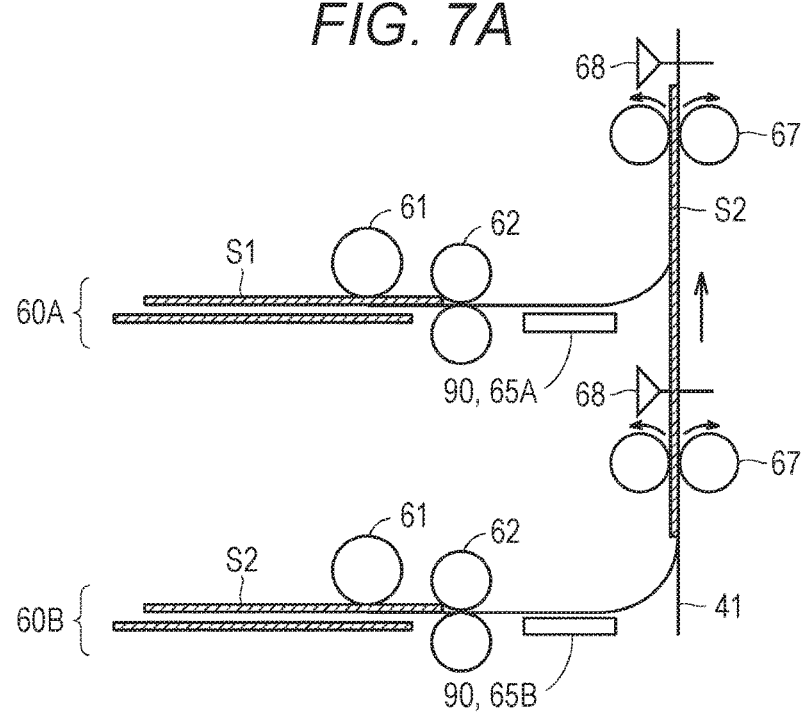
FIGS. 7A and 7B are views illustrating a difference in a position of a sheet being conveyed from another storage.
Figure 7B:
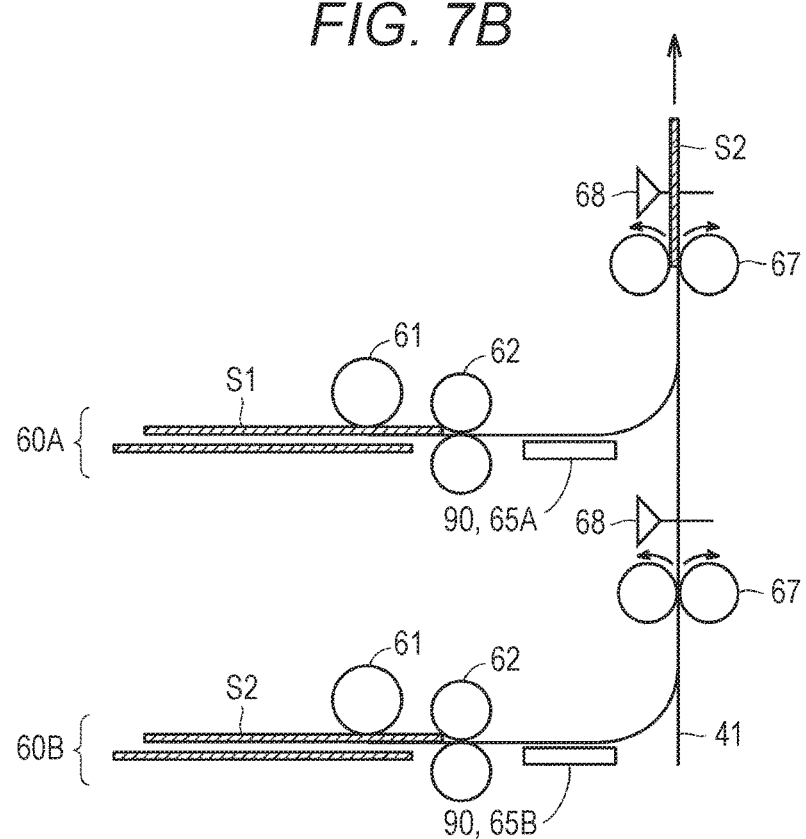

In still another aspect, the capacitance during non-sheet passing is detected by the capacitance detector 65 on the basis of the position of the sheet S fed from the storage 60. FIGS. 7A and 7B are views illustrating the difference in the position of a sheet S2 being conveyed from the storage 60B. FIGS. 7A and 7B illustrate a capacitance detector 65A and a capacitance detector 65B. The capacitance detector 65A is for a sheet S1 stored in the storage 60A. The capacitance detector 65B is for the sheet S2 stored in the storage 60B. As illustrated in FIG. 7A, when the sheet S2 conveyed from the storage 60B passes in the vicinity of the capacitance detector 65A for the sheet S1, the capacitance detector 65A is influenced by the sheet S2. On the other hand, as illustrated in FIG. 7B, when the sheet S2 conveyed from the storage 60B is away from the capacitance detector 65A for the sheet S1, the capacitance detector 65A is not influenced by the sheet S2. Therefore, when the sheet S2 is present within a range in which the detection result of the capacitance detector 65A is influenced by the conveyance of the sheet S2 fed from another storage, i.e., the storage 60B, the capacitance detector 65A does not detect the capacitance during non-sheet passing.

The range in which the detection result of the capacitance detector 65A is influenced by the conveyance of the sheet S2 is preliminarily acquired by experiment, simulation, or the like. When the position of the sheet S2 is within the range in which the detection result is influenced by the conveyance of the sheet S2, the capacitance detector 65A does not detect the capacitance during non-sheet passing. The position of the sheet S2 is calculated on the basis of; for example, the time elapsed since the detection timing of the sheet S2 by the sheet sensor 63 as well as the predetermined conveyance speed of the sheet S2.

In still another aspect, with another storage, i.e., the adjacent storage 60B, detached from the image forming apparatus 100, the capacitance detector 65A detects the capacitance during non-sheet passing at any time. Preferably, the capacitance detector 65A detects the capacitance during non-sheet passing immediately after detecting the state in which another storage, i.e., the adjacent storage 60B, is detached from the image forming apparatus 100. On the other hand, with another storage, i.e., the adjacent storage 60B, attached to the image forming apparatus 100, the capacitance detector 65A detects the capacitance during non-sheet passing on the basis of the completion of the preparation processing for feeding the sheet S2 stored in the storage 60B to the conveyance path 41. With such a configuration, the detection result of the capacitance during non-sheet passing is not influenced by the movement of the adjacent storage 60B.

[Update Timing of Capacitance During Non-Sheet Passing]

It is preferred that the environment at the detection timing of the capacitance during non-sheet passing is close to the environment at the detection timing of the capacitance during sheet passing in order to reduce the influence of the environmental variations. Therefore, in a case where the image forming apparatus 100 detects a change in the surrounding environment, the image forming apparatus 100 permits updating of the capacitance during non-sheet passing. Then, the capacitance detector 65 newly detects the capacitance during non-sheet passing at the "detection timing of the capacitance during non-sheet passing" described above during the permission period, and updates the currently stored capacitance during non-sheet passing with the new capacitance during non-sheet passing. Regularly updating the capacitance during non-sheet passing reduces the difference between the environment at the detection timing of the capacitance during non-sheet passing and the environment at the detection timing of the capacitance during sheet passing, whereby the influence of the environmental variations is reduced more assuredly.

The update of the capacitance during non-sheet passing is permitted at various timings. In one aspect, the capacitance detector 65 is permitted to detect the capacitance during non-sheet passing each time a predetermined number of sheets S is fed from the storage 60 to the conveyance path 41. Such a configuration reduces the influence of the environmental variations due to the sheet reduction. Preferably, the predetermined number of sheets S can be changed depending on the detected basis weight of the sheet S. As an example, the smaller the basis weight of the sheet S, the larger the predetermined number of sheets S the image forming apparatus 100 sets.

In another aspect, the capacitance detector 65 is permitted to detect the capacitance during non-sheet passing on the basis of the completion of the processing in which the lift 58 lifts the sheet S stored in the storage 60 to the sheet feeding roller 61.

[Detection Timing of Capacitance During Sheet Passing]

The capacitance during sheet passing is detected at any time as long as the sheet S is present in the detection region AR of the capacitance detector 65. The following describes concrete examples of the detection timing of the capacitance during sheet passing.

The capacitance during sheet passing is detected by the capacitance detector 65 on the basis of the timing when the above-described sheet sensor 63 detects the sheet S. With such a configuration, the capacitance detector 65 can detect the capacitance while the sheet S is being conveyed along the conveyance path 41.

Preferably, the detection timing of the capacitance during sheet passing is changed depending on the positional relationship between the capacitance detector 65 and the sheet sensor 63.

In one aspect, the sheet sensor 63 and the capacitance detector 65 are arranged in order of the sheet conveyance direction along the conveyance path 41. That is, the capacitance detector 65 is arranged on the downstream side of the sheet sensor 63 in the sheet conveyance direction. In this case, the capacitance during sheet passing is detected by the capacitance detector 65 at the timing when a predetermined time has elapsed since the detection timing of the sheet S by the sheet sensor 63. The predetermined time is preliminarily set so as to correspond to the timing at which the sheet S reaches the detection region AR.

In another aspect, the capacitance detector 65 and the sheet sensor 63 are arranged in order of the sheet conveyance direction along the conveyance path 41. That is, the capacitance detector 65 is arranged on the upstream side of the sheet sensor 63 in the sheet conveyance direction. The distance between the capacitance detector 65 and the sheet sensor 63 is shorter than the width of the sheet S in the conveyance direction. In this case, the capacitance during sheet passing is detected by the capacitance detector 65 at the timing when the sheet sensor 63 detects the sheet S.

Preferably, the capacitance during sheet passing is detected by the capacitance detector 65 at the timing when the central portion of the sheet S reaches the detection region AR. More specifically, the capacitance detector 65 preliminarily acquires the width of the sheet S in the conveyance direction. The width is acquired from print setting information (e.g., the size of the print sheet) received from the user. After the leading end of the sheet S as the conveyance target reaches the detection region AR and the half of the width of the sheet S is further conveyed, the capacitance detector 65 detects the capacitance during sheet passing. The fact that the leading end of the sheet S as the conveyance target has reached the detection region AR may be detected on the basis of the change in the capacitance outputted from the capacitance detector 65 or may be detected on the basis of the detection timing of the sheet S by the sheet sensor 63.

[Functional Configurations of Image Forming Apparatus 100]

Figure 8:
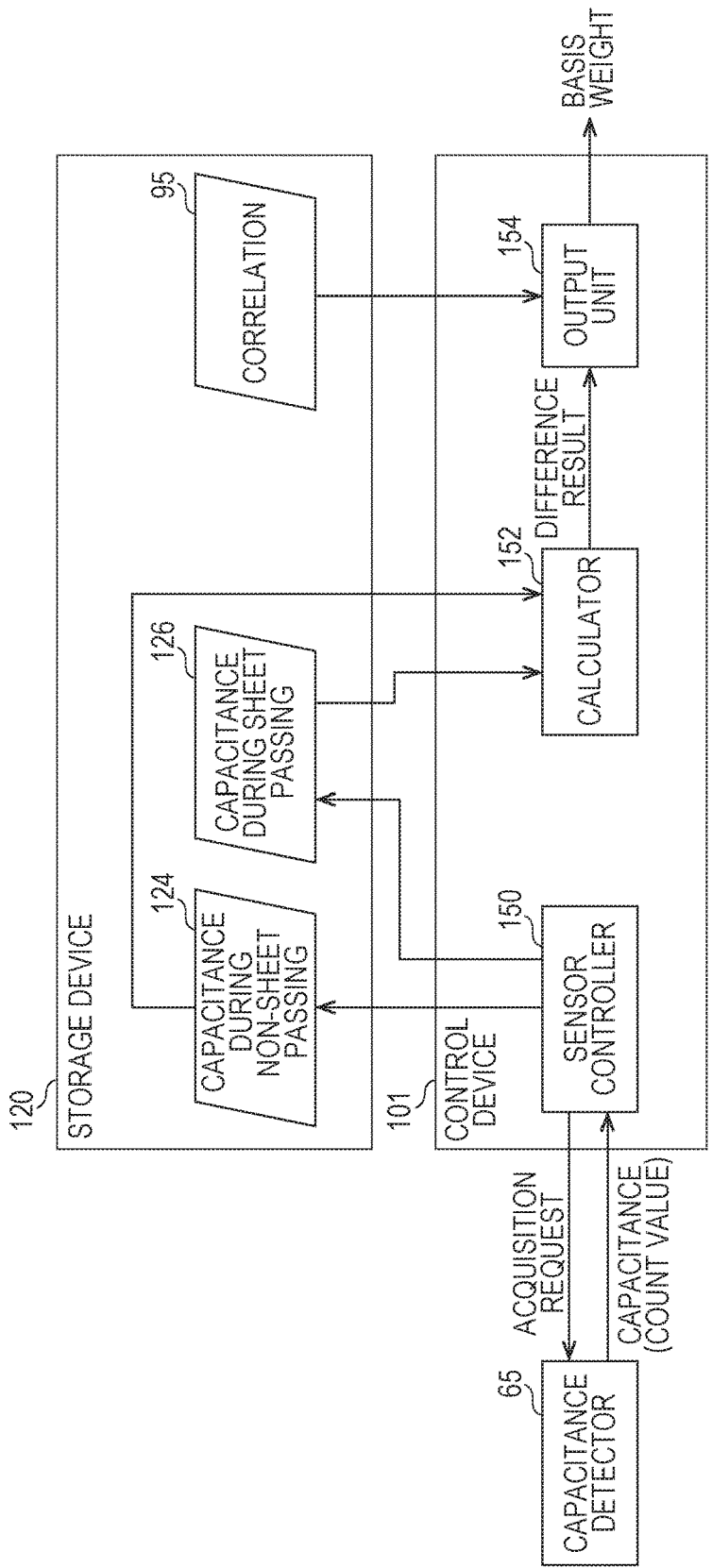
FIG. 8 is a diagram illustrating exemplary functional configurations of the image forming apparatus.

The following describes the functions of the image forming apparatus 100 with reference to FIG. 8. FIG. 8 is a diagram illustrating exemplary functional configurations of the image forming apparatus 100.

As illustrated in FIG. 8, the image forming apparatus 100 includes the capacitance detector 65, the control device 101, and the storage device 120 as a main hardware configuration. The control device 101 includes, as the functional configurations, a sensor controller 150, a calculator 152, and an output unit 154.

The sensor controller 150 controls the capacitance detector 65. More specifically, the sensor controller 150 outputs a capacitance acquisition request to the capacitance detector 65 at the "detection timing of the capacitance during non-sheet passing" described above, and acquires the capacitance from the capacitance detector 65. The acquired capacitance is written to the storage device 120 as capacitance during non-sheet passing 124. In addition, the sensor controller 150 outputs a capacitance acquisition request to the capacitance detector 65 at the "detection timing of the capacitance during sheet passing" described above, and acquires the capacitance from the capacitance detector 65. The acquired capacitance is written to the storage device 120 as capacitance during sheet passing 126.

The calculator 152 excludes the influence of the environmental variations from the capacitance during sheet passing 126 by using the capacitance during non-sheet passing 124. As an example, the calculator 152 excludes the influence of the environmental variations by subtracting the capacitance during non-sheet passing 124 from the capacitance during sheet passing 126. The result of the difference is outputted to the output unit 154.

On the basis of the correlation 95 defining the relationship between the capacitance of the sheet and the basis weight of the sheet, the output unit 154 identifies the basis weight corresponding to the result of the difference between the capacitance during non-sheet passing 124 and the capacitance during sheet passing 126. Since the method for identifying the basis weight of the sheet using the correlation 95 is as described with reference to FIG. 5, the description thereof will not be repeated.

Although a description has been given of the example in which each functional configuration illustrated in FIG. 8 is implemented in the image forming apparatus 100, each functional configuration illustrated in FIG. 8 may be implemented in a sheet conveying apparatus included in the image forming apparatus 100. The sheet conveying apparatus herein indicates an apparatus having a mechanism for conveying sheets. The sheet conveying apparatus may be integrated with the image forming apparatus 100 or provided separately from the image forming apparatus 100. In addition, at least part of the functional configurations illustrated in FIG. 8 may be implemented in an external device such as a server.

[Control Structure of Image Forming Apparatus 100]

Figure 9:
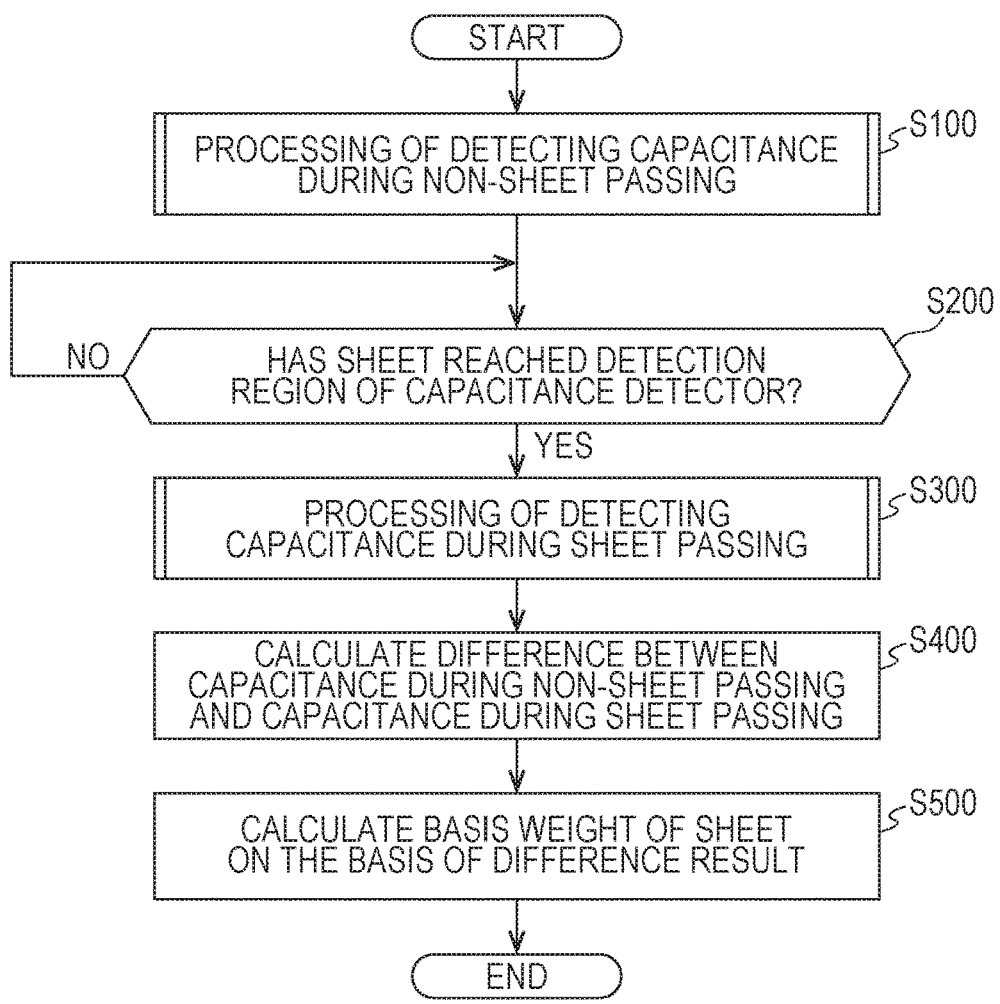
FIG. 9 is a flowchart illustrating processing of detecting the basis weight of the sheet.

The following describes the control structure of the image forming apparatus 100 with reference to FIG. 9. FIG. 9 is a flowchart illustrating the processing of detecting the basis weight of the sheet. The processing in FIG. 9 is performed by the control device 101 of the image forming apparatus 100 executing the program. In another aspect, part or all of the processing may be executed by a circuit element or other hardware.

In step S100, the control device 101 which serves as the above-described sensor controller 150 (refer to FIG. 8) executes the processing of detecting the capacitance during non-sheet passing. The details of the processing in step S100 will be described later.

In step S200, the control device 101 determines whether the sheet has reached the detection region AR of the capacitance detector 65. When the control device 101 determines that the sheet has reached the detection region AR of the capacitance detector 65 (YES in step S200), the control device 101 switches the control to step S300. When not (NO in step S200), the control device 101 executes the processing in step S200 again.

In step S300, the control device 101 which serves as the above-described sensor controller 150 executes the processing of detecting the capacitance during sheet passing. The details of the processing in step S300 will be described later.

In step S400, the control device 101 which serves as the above-described calculator 152 (refer to FIG. 8) calculates the difference between the capacitance during non-sheet passing detected in step S100 and the capacitance during sheet passing detected in step S300.

In step S500, the control device 101 which serves as the above-described output unit 154 (refer to FIG. 8) refers to the correlation 95 defining the relationship between the capacitance of the sheet and the basis weight of the sheet, and identifies the basis weight corresponding to the result of the difference calculated in step S400. Since the method for identifying the basis weight of the sheet using the correlation 95 is as described with reference to FIG. 5, the description thereof will not be repeated.

(Modification)

Figure 10:
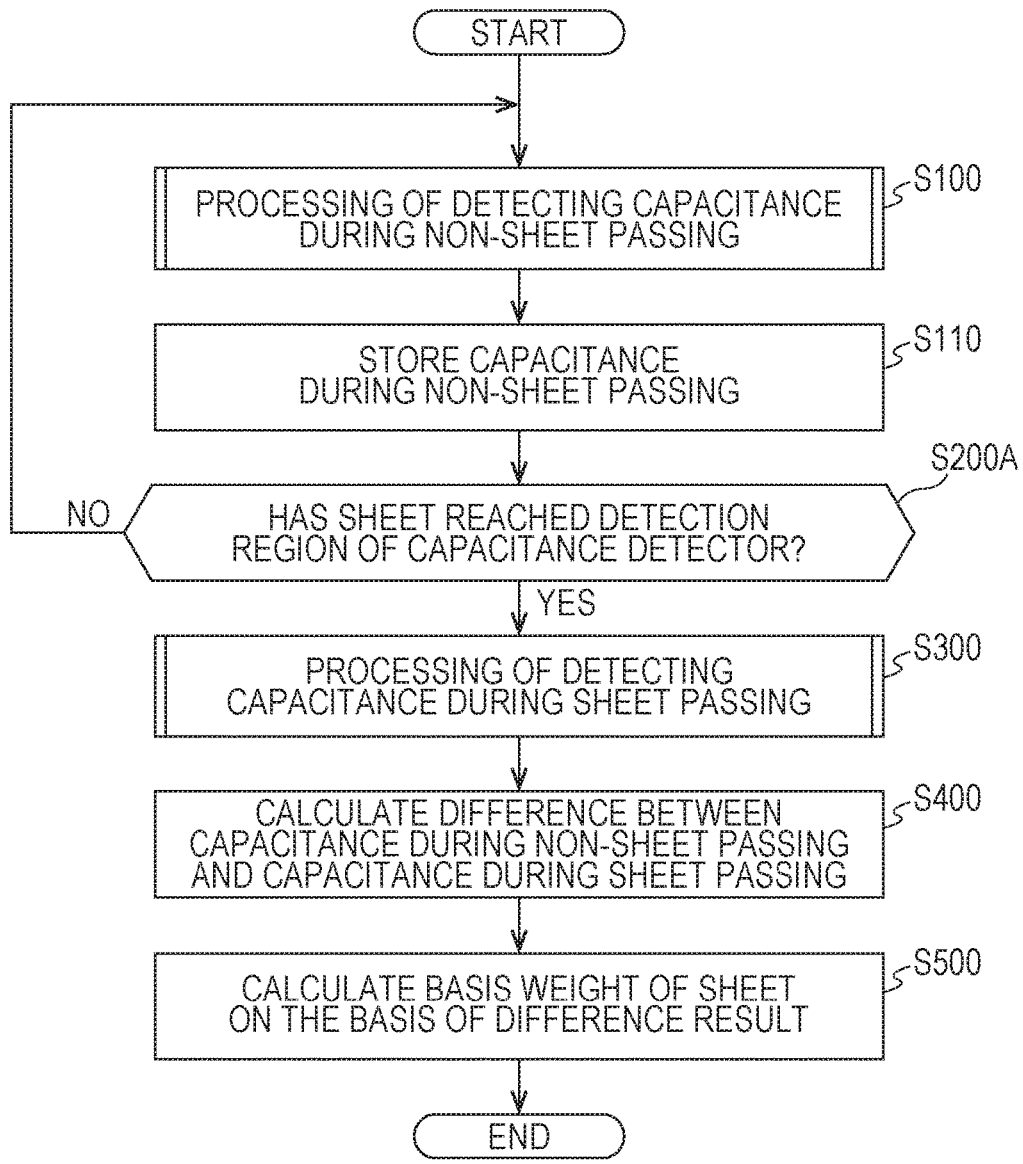
FIG. 10 is a flowchart illustrating a modification of the processing of detecting the basis weight of the sheet.

The following describes a modification of the flow of calculating the basis weight of the sheet with reference to FIG. 10. FIG. 10 is a flowchart illustrating the modification of the processing of detecting the basis weight of the sheet.

In the modification, the capacitance during non-sheet passing is updated regularly. Therefore, the processing in steps S100, S110, and S200A is repeated. Since the processing other than steps S110 and S200A are as described with reference to FIG. 9, the description thereof will not be repeated below.

In step S110, the control device 101 which serves as the above-described sensor controller 150 (refer to FIG. 8) stores the capacitance during non-sheet passing detected in step S100. Preferably, when the capacitance during non-sheet passing detected this time is different from the currently stored capacitance during non-sheet passing by a predetermined value or greater, the control device 101 newly stores the capacitance during non-sheet passing. This capacitance is stored in the storage device 120 of the image forming apparatus 100 as the capacitance during non-sheet passing 124 (refer to FIG. 8).

In step S200A, the control device 101 determines whether the sheet has reached the detection region AR of the capacitance detector 65. When the control device 101 determines that the sheet has reached the detection region AR of the capacitance detector 65 (YES in step S200A), the control device 101 switches the control to step S300. When not (NO in step S200A), the control device 101 returns the control to step S100.

[Flow of Detecting Capacitance During Non-Sheet Passing]

The following describes a flow of detecting the capacitance during non-sheet passing with reference to FIGS. 11 to 14. The processing illustrated in FIGS. 11 to 14 corresponds to the processing in step S100 illustrated in FIG. 9. The control device 101 executes at least one processing illustrated in FIGS. 11 to 14 as the processing in step S100. Alternatively, the control device 101 may also execute in parallel at least two of the processing illustrated in FIGS. 11 to 14 as the processing in step S100.

The processing in FIGS. 11 to 14 is performed by the control device 101 of the image forming apparatus 100 executing the program. In another aspect, part or all of the processing may be executed by a circuit element or other hardware.

(Flow 1 of Detecting Capacitance During Non-Sheet Passing)

Figure 11:
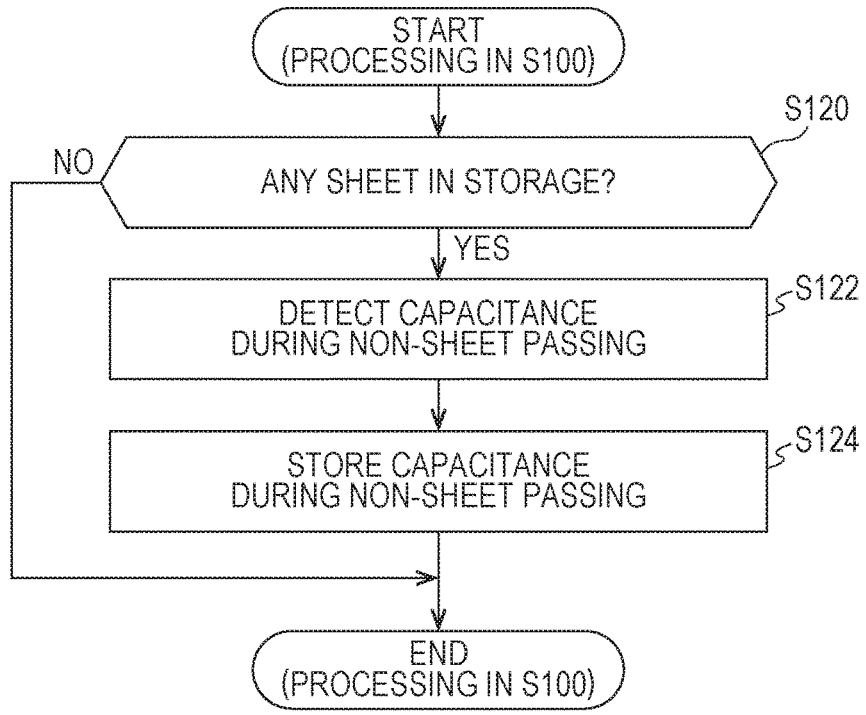
FIG. 11 is a flowchart illustrating a flow 1 of detecting the capacitance during non-sheet passing.

The following describes an exemplary flow of detecting the capacitance during non-sheet passing with reference to FIG. 11. FIG. 11 is a flowchart illustrating the flow 1 of detecting the capacitance during non-sheet passing.

In step S120, the control device 101 determines whether there is any sheet in the storage 60. Whether there is any sheet in the storage 60 is determined on the basis of; for example, the sheet detection result of the sheet sensor 64 (refer to FIG. 1). When the control device 101 determines that there is a sheet in the storage 60 (YES in step S120), the control device 101 switches the control to step S122. When not (NO in step S120), the control device 101 ends the processing illustrated in FIG. 11.

In step S122, the control device 101 outputs an instruction to acquire the capacitance to the capacitance detector 65, and acquires the capacitance during non-sheet passing.

In step S124, the control device 101 writes the capacitance during non-sheet passing acquired in step S122 to the storage device 120.

As described above, in a case where there is a sheet in the storage 60, the control device 101 detects the capacitance during non-sheet passing. With such a configuration, in a case where there is no sheet in the storage 60, the control device 101 does not detect the capacitance during non-sheet passing. Therefore, it is possible to avoid unnecessary detection of the capacitance during non-sheet passing.

(Flow 2 of Detecting Capacitance During Non-Sheet Passing)

Figure 12:
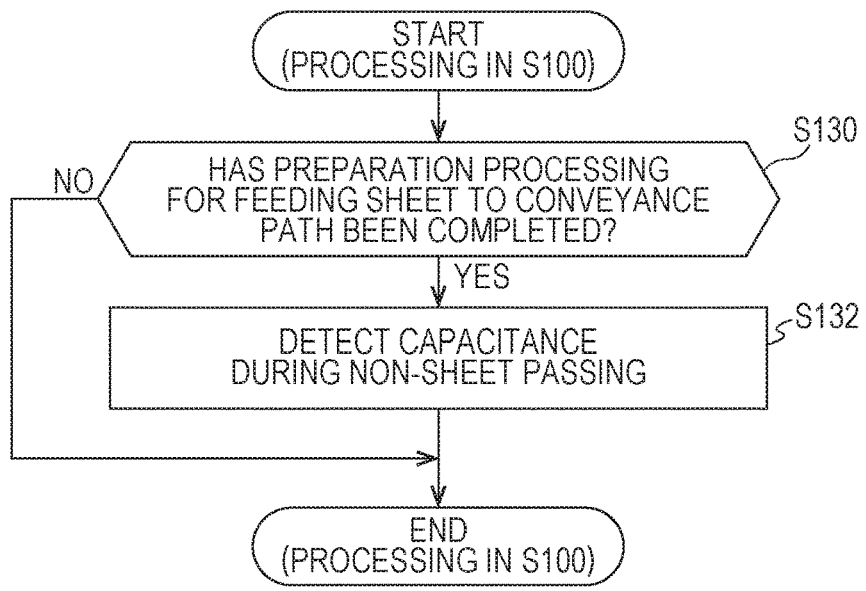
FIG. 12 is a flowchart illustrating a flow 2 of detecting the capacitance during non-sheet passing.

The following describes another exemplary flow of detecting the capacitance during non-sheet passing with reference to FIG. 12. FIG. 12 is a flowchart illustrating the flow 2 of detecting the capacitance during non-sheet passing.

In step S130, the control device 101 determines whether the preparation processing for feeding the sheet to the conveyance path 41 is completed. The preparation processing is, for example, processing in which the lift 58 lifts the sheet stored in the storage 60 to the sheet feeding roller 61. When the control device 101 determines that the preparation processing for feeding the sheet to the conveyance path 41 is completed (YES in step S130), the control device 101 switches the control to step S132. When not (NO in step S130), the control device 101 ends the processing illustrated in step FIG. 12.

In step S132, the control device 101 outputs an instruction to acquire the capacitance to the capacitance detector 65, and acquires the capacitance during non-sheet passing.

As described above, the control device 101 detects the capacitance during non-sheet passing at the timing when the lift 58 completes the sheet lifting processing. This allows the control device 101 to remove the influence of the lifting processing.

(Flow 3 of Detecting Capacitance During Non-Sheet Passing)

Figure 13:
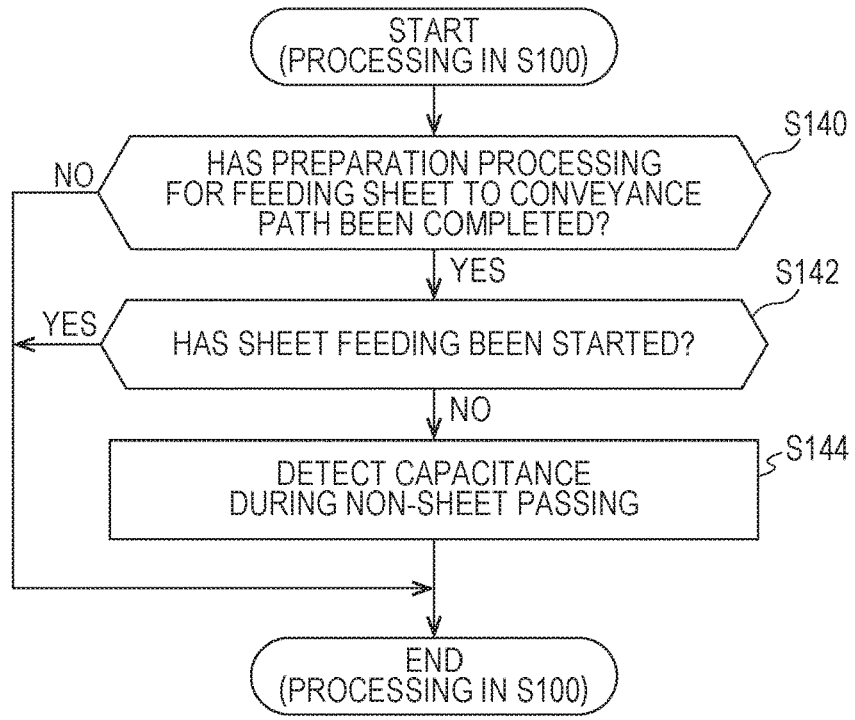
FIG. 13 is a flowchart illustrating a flow 3 of detecting the capacitance during non-sheet passing.

The following describes still another exemplary flow of detecting the capacitance during non-sheet passing with reference to FIG. 13. FIG. 13 is a flowchart illustrating the flow 3 of detecting the capacitance during non-sheet passing. The detection processing illustrated in FIG. 13 is different from the detection processing illustrated in FIG. 12 in that the capacitance during non-sheet passing is detected by the time sheet feeding is started.

In step S140, the control device 101 determines whether the preparation processing for feeding the sheet to the conveyance path 41 is completed. The preparation processing is, for example, processing in which the lift 58 lifts the sheet stored in the storage 60 to the sheet feeding roller 61. When the control device 101 determines that the preparation processing for feeding the sheet to the conveyance path 41 is completed (YES in step S140), the control device 101 switches the control to step S142. When not (NO in step S140), the control device 101 ends the processing illustrated in step FIG. 13.

In step S142, the control device 101 determines whether the feeding of the sheet to the conveyance path 41 has been started. Whether the sheet feeding has been started is determined on the basis of, for example, the sheet detection result of the sheet sensor 63 (refer to FIG. 1). When the control device 101 determines that the feeding of the sheet to the conveyance path 41 has been started (YES in step S142), the control device 101 ends the processing illustrated in step FIG. 13. When not (NO in step S142), the control device 101 switches the control to step S144.

In step S144, the control device 101 outputs an instruction to acquire the capacitance to the capacitance detector 65, and acquires the capacitance during non-sheet passing.

As described above, the control device 101 does not detect the capacitance during non-sheet passing after the sheet feeding has been started. In other words, the control device 101 detects the capacitance during non-sheet passing during a period between after the lift 58 completes the sheet lifting processing and before the timing when the sheet feeding is started.

(Flow 4 of Detecting Capacitance During Non-Sheet Passing)

Figure 14:
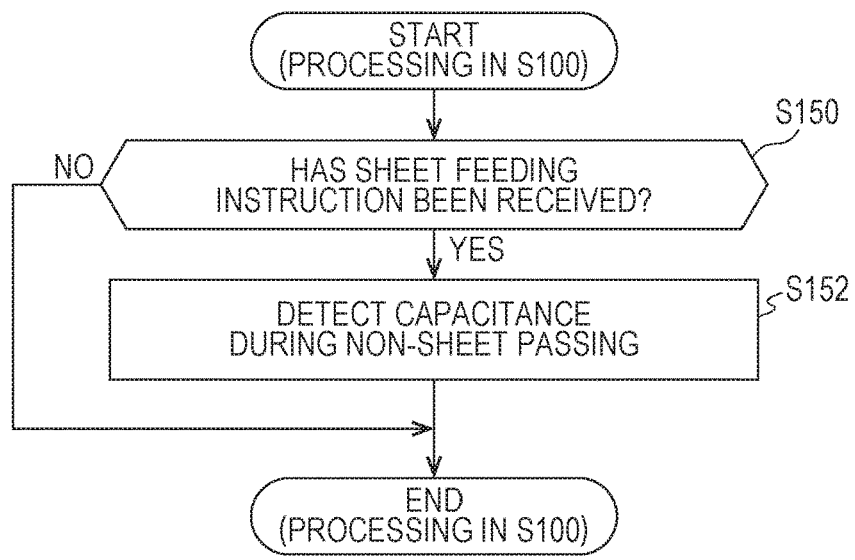
FIG. 14 is a flowchart illustrating a flow 4 of detecting the capacitance during non-sheet passing.

The following describes still another exemplary flow of detecting the capacitance during non-sheet passing with reference to FIG. 14. FIG. 14 is a flowchart illustrating the flow 4 of detecting the capacitance during non-sheet passing.

In step S150, the control device 101 determines whether a sheet feeding instruction has been received. The sheet feeding instruction is issued, for example, on the basis of the reception of a print instruction from the user. When the control device 101 determines that the sheet feeding instruction has been received (YES in step S150), the control device 101 switches the control to step S152. When not (NO in step S150), the control device 101 ends the processing illustrated in step FIG. 14.

In step S152, the control device 101 outputs an instruction to acquire the capacitance to the capacitance detector 65, and acquires the capacitance during non-sheet passing.

As described above, the control device 101 detects the capacitance during non-sheet passing after the sheet feeding instruction is received. With such a configuration, the control device 101 can omit the processing of detecting the capacitance during non-sheet passing until the sheet feeding instruction is received.

(Flow 5 of Detecting Capacitance During Non-Sheet Passing)

Figure 15:
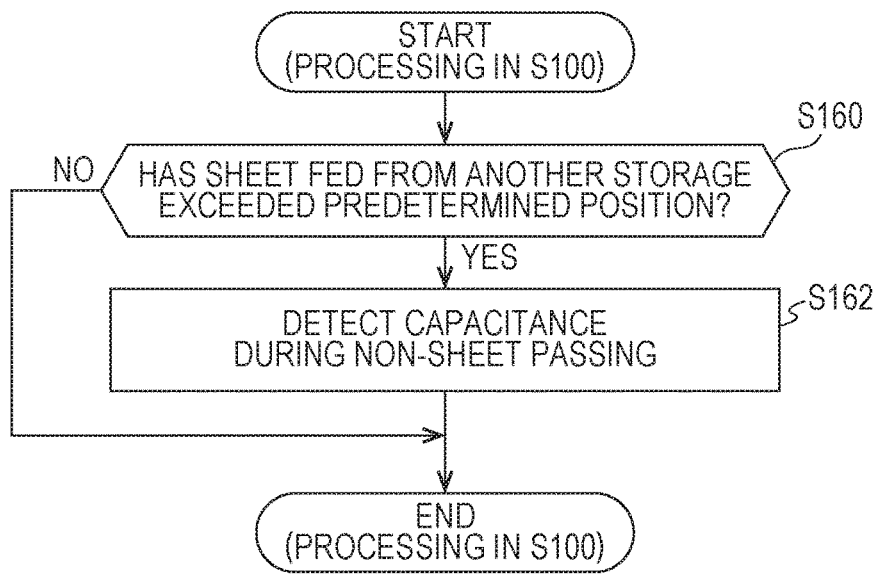
FIG. 15 is a flowchart illustrating a flow 5 of detecting the capacitance during non-sheet passing.

The following describes still another exemplary flow of detecting the capacitance during non-sheet passing with reference to FIG. 15. FIG. 15 is a flowchart illustrating the flow 5 of detecting the capacitance during non-sheet passing.

As described with reference to FIGS. 7A and 7B, when the sheet S2 conveyed from the storage 60B passes in the vicinity of the capacitance detector 65A for the sheet S1, the capacitance detector 65A is influenced by the sheet S2. On the other hand, when the sheet S2 conveyed from the storage 60B is away from the capacitance detector 65A for the sheet S1, the capacitance detector 65A is not influenced by the sheet S2. Therefore, when the sheet S2 is present within a range in which the detection result of the capacitance detector 65A is influenced by the conveyance of the sheet S2 fed from another storage, i.e., the storage 60B, the capacitance detector 65A does not detect the capacitance during non-sheet passing.

More specifically, the control device 101 determines in step S160 whether the sheet S2 fed from the storage 60B has exceeded a predetermined position. The predetermined position corresponds to, for example, the installation position of the conveying rollers 62, the sheet sensor 63, or the like provided on the downstream side of the capacitance detector 65. The position of the sheet S2 is identified from the sheet detection result of the sheet sensor 63 and the sheet conveyance speed, for example. When the control device 101 determines that the sheet S2 fed from the storage 60B has exceeded the predetermined position (YES in step S160), the control device 101 switches the control to step S162. When not (NO in step S160), the control device 101 ends the processing illustrated in FIG. 15. In step S162, the control device 101 outputs an instruction to acquire the capacitance to the capacitance detector 65, and acquires the capacitance during non-sheet passing.

[Flow of Detecting Capacitance During Sheet Passing]

Figure 16:
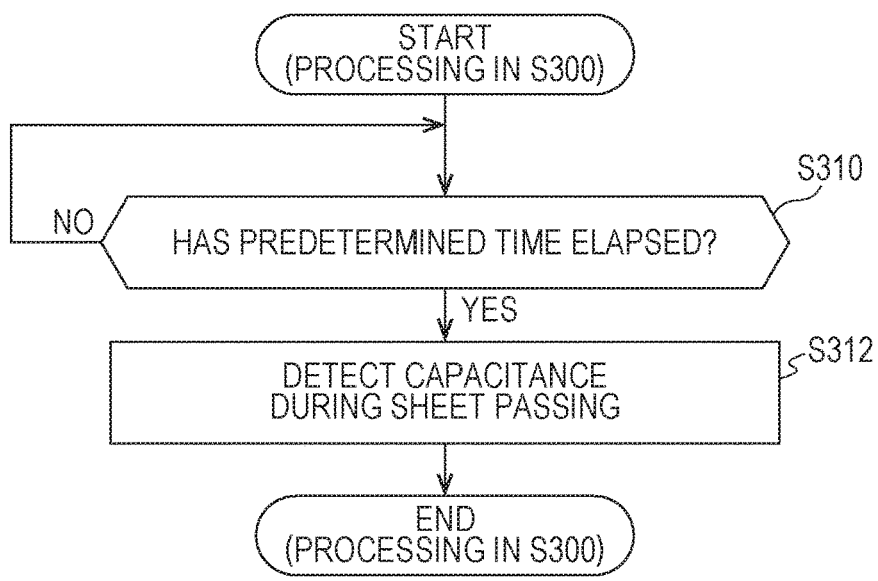
FIG. 16 is a flowchart illustrating an exemplary flow of detecting the capacitance during sheet passing.

The following describes a flow of detecting the capacitance during sheet passing with reference to FIG. 16. FIG. 16 is a flowchart illustrating an exemplary flow of detecting the capacitance during sheet passing.

The processing illustrated in FIG. 16 corresponds to the processing in step S300 illustrated in FIG. 9. The processing in FIG. 16 is performed by the control device 101 of the image forming apparatus 100 executing the program. In another aspect, part or all of the processing may be executed by a circuit element or other hardware.

In step S310, the control device 101 determines whether a predetermined time has elapsed since the determination made in step S200 (refer to FIG. 9) that the leading end of the sheet has reached the detection region AR of the capacitance detector 65. Preferably, the length of the predetermined time is preliminarily adjusted such that the capacitance is detected while the central portion of the sheet is within the detection region AR. When the control device 101 determines that the predetermined time has elapsed since the determination made in step S200 that the leading end of the sheet has reached the detection region AR of the capacitance detector 65 (YES in step S310), the control device 101 switches the control to step S312. When not (NO in step S310), the control device 101 executes the processing in step S310 again.

In step S312, the control device 101 outputs an instruction to acquire the capacitance to the capacitance detector 65, and acquires the capacitance during sheet passing.

The control device 101 does not necessarily execute the processing in step S310. In this case, the control device 101 detects the capacitance during sheet passing at the timing when the leading end of the sheet reaches the detection region AR of the capacitance detector 65.

[Hardware Configuration of Image Forming Apparatus 100]

Figure 17:
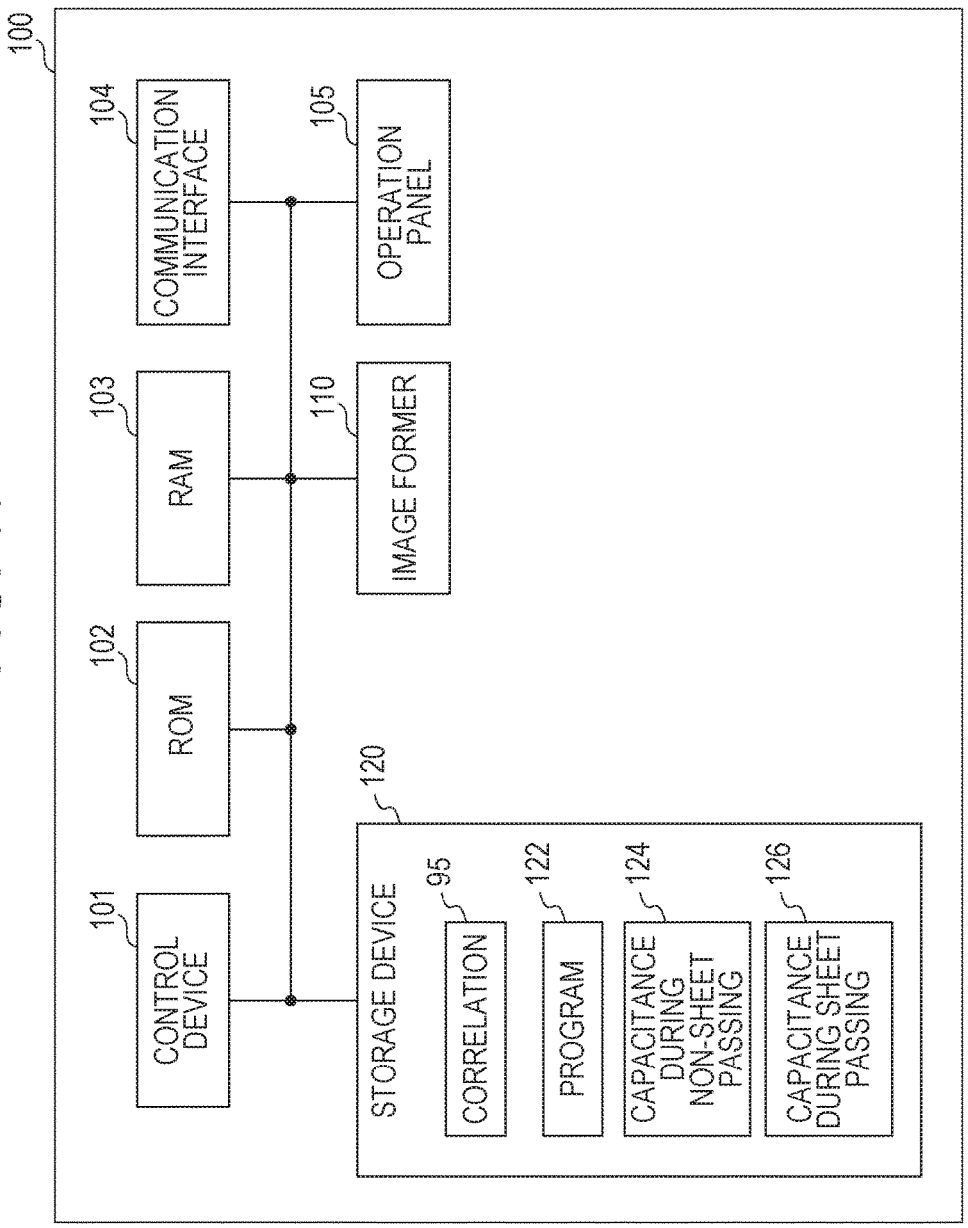
FIG. 17 is a block diagram illustrating a main hardware configuration of the image forming apparatus.

The following describes an exemplary hardware configuration of the image forming apparatus 100 with reference to FIG. 17. FIG. 17 is a block diagram illustrating a main hardware configuration of the image forming apparatus 100.

As illustrated in FIG. 17, the image forming apparatus 100 includes the control device 101, a read only memory (ROM) 102, a random access memory (RAM) 103, a communication interface 104, an operation panel 105, the image former 110, and the storage device 120.

The control device 101 includes at least one integrated circuit, for example. The integrated circuit includes, for example, at least one central processing unit (CPU), at least one application specific integrated circuit (ASIC), at least one field programmable gate array (FPGA), or a combination thereof.

The control device 101 controls the operation of the image forming apparatus 100 by executing various programs such as a program 122 according to the present embodiment. Upon receiving an instruction to execute the program 122, the control device 101 reads the program 122 from the storage device 120 to the ROM 102. The RAM 103 functions as a working memory, and temporarily stores various data necessary for executing the program 122.

An antenna (not illustrated) or the like is connected to the communication interface 104. The image forming apparatus 100 exchanges data with an external communication device through the antenna. Examples of the external communication device include a mobile communication terminal such as a smartphone, and a server. The image forming apparatus 100 may also be configured such that the program 122 can be downloaded from a server through the antenna.

The operation panel 105 includes a display and a touch panel, for example. The display and the touch panel are overlaid with each other, and the operation panel 105 receives, for example, an input of setting values to be set to the program 122 according to the present embodiment. As an example, the operation panel 105 receives settings for the detection timing of the capacitance during non-sheet passing and the capacitance during sheet passing. Furthermore, the operation panel 105 may also display the estimation result of the basis weight of the sheet.

The image former 110 forms a toner image corresponding to an image pattern to be printed, and prints the toner image on the sheet. The details of the image former 110 will be described later.

The storage device 120 is a storage medium such as a hard disk or an external storage device, for example. The storage device 120 stores, for example, the above-described correlation 95 (refer to FIG. 5), the program 122 for estimating the basis weight of the sheet, the capacitance during non-sheet passing 124, and the capacitance during sheet passing 126. The place to store the correlation 95, the program 122, the capacitance during non-sheet passing 124, and the capacitance during sheet passing 126 is not limited to the storage device 120. At least part of the correlation 95, the program 122, the capacitance during non-sheet passing 124, and the capacitance during sheet passing 126 may be stored in a storage area (e.g., a cache) of the control device 101, the ROM 102, the RAM 103, an external device (e.g., a server), or the like.

The program 122 may be provided as part of an arbitrary program, instead of a single program. In this case, the control processing according to the present embodiment is performed in cooperation with the arbitrary program. Even such a program that does not include part of modules does not depart from the gist of the program 122 according to the present embodiment. Furthermore, part or all of the functions provided by the program 122 may be implemented by dedicated hardware. Furthermore, the configuration of the image forming apparatus 100 may be in the form of a so-called cloud service or the like where at least one server executes part of the processing of the program 122.

[Internal Structure of Image Former 110]

Figure 18:
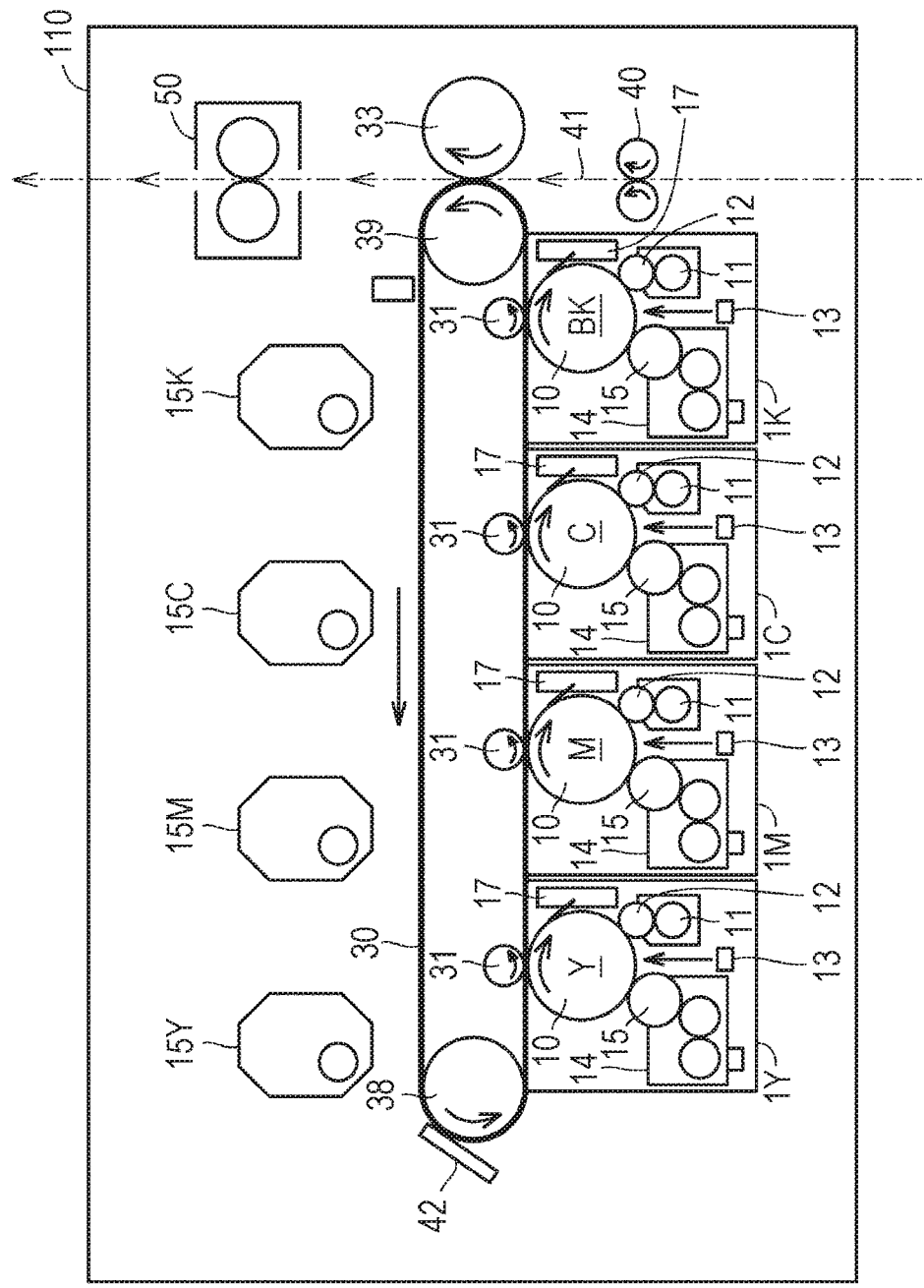
FIG. 18 is a view illustrating an exemplary internal structure of an image former.

The following describes the image former 110 included in the image forming apparatus 100 with reference to FIG. 18. FIG. 18 is a view illustrating an exemplary internal structure of the image former 110.

The image former 110 includes image forming units 1Y, 1M, 1C, and 1K, toner bottles 15Y, 15M, 15C, and 15K, an intermediate transfer belt 30, primary transfer rollers 31, a secondary transfer roller 33, a driven roller 38, a driving roller 39, timing rollers 40, a cleaning device 42, a fixing device 50, and a control device 101.

The image forming unit 1Y is supplied with toner from the toner bottle 15Y to form a toner image in yellow (Y) on its corresponding photoconductor 10. The image forming unit 1M is supplied with toner from the toner bottle 15M to form a toner image in magenta (M) on its corresponding photoconductor 10. The image forming unit 1C is supplied with toner from the toner bottle 15C to form a toner image in cyan (C) on its corresponding photoconductor 10. The image forming unit 1K is supplied with toner from the toner bottle 15K to form a toner image in black (BK) on its corresponding photoconductor 10.

The image forming units 1Y, 1M, 1C, and 1K are arranged in order of the rotation direction of the intermediate transfer belt 30 along the intermediate transfer belt 30. The image forming units 1Y, 1M, 1C, and 1K each include the photoconductor 10, a charging device 11, an exposure device 13, a development device 14, and a cleaning device 17.

Each charging device 11 includes a charging roller 12. The charging rollers 12 are each in contact with the corresponding photoconductor 10. The charging rollers 12 each charge the surface of the corresponding photoconductor 10 to a predetermined potential uniformly.

Each exposure device 13 irradiates the corresponding photoconductor 10 with laser light in response to a control signal from the control device 101 and exposes the surface of the corresponding photoconductor 10 in accordance with an inputted image pattern. In this manner, an electrostatic latent image corresponding to the inputted image is formed on the corresponding photoconductor 10.

Each development device 14 develops the electrostatic latent image formed on the corresponding photoconductor 10 as a toner image. More specifically, each development device 14 applies a development bias to a corresponding development roller 15 while rotating the development roller 15, and causes the toner to adhere to the surface of the development roller 15. Then, the toner is transferred from the development roller 15 to the corresponding photoconductor 10, and the toner image corresponding to the electrostatic latent image is developed on the surface of the corresponding photoconductor 10.

The photoconductors 10 and the intermediate transfer belt 30 are in contact with each other in portions in which the respective primary transfer rollers 31 are provided. A transfer voltage having an opposite polarity to the toner images is applied to the primary transfer rollers 31, whereby the toner images are transferred from the respective photoconductors 10 to the intermediate transfer belt 30. The toner image in yellow (Y), the toner image in magenta (M), the toner image in cyan (C), and the toner image in black (BK) are sequentially overlaid, and transferred from the respective photoconductors 10 to the intermediate transfer belt 30. In this manner, a color toner image is formed on the intermediate transfer belt 30.

The intermediate transfer belt 30 extends between the driven roller 38 and the driving roller 39. The driving roller 39 is connected to a motor (not illustrated). The control device 101 controls the motor, thereby rotating the driving roller 39. The intermediate transfer belt 30 and the driven roller 38 rotate in conjunction with the driving roller 39. In this manner, the toner image on the intermediate transfer belt 30 is transferred to the secondary transfer roller 33.

Each cleaning device 17 recovers the toner remaining on the surface of the corresponding photoconductor 10 after the toner image is transferred from the corresponding photoconductor 10 to the intermediate transfer belt 30.

The secondary transfer roller 33 applies the transfer voltage having the opposite polarity to the toner image to the sheet S currently being conveyed. Accordingly, the toner image is attracted from the intermediate transfer belt 30 to the secondary transfer roller 33, through which the toner image on the intermediate transfer belt 30 is transferred. The timing of conveying the sheet S to the secondary transfer roller 33 is controlled by the timing rollers 40 so as to be aligned with the position of the toner image on the intermediate transfer belt 30. As a result, the toner image on the intermediate transfer belt 30 is transferred to an appropriate position of the sheet S.

The fixing device 50 pressurizes and heats the sheet S passing through the fixing device 50. Therefore, the toner image is fixed on the sheet S.

The cleaning device 42 recovers the toner remaining on the surface of the intermediate transfer belt 30 after the toner image is transferred from the intermediate transfer belt 30 to the sheet S. The recovered toner is conveyed by a conveying screw (not illustrated) and stored in a waste toner container (not illustrated).

[Summary of First Embodiment]

As described above, the image forming apparatus 100 according to the present embodiment calculates the capacitance of the sheet S on the basis of the capacitance detected while the sheet S does not pass through the detection region AR of the capacitance detector 65 (i.e., the capacitance during non-sheet passing) and the capacitance detected while the sheet S passes through the detection region AR of the capacitance detector 65 (i.e., the capacitance during sheet passing). Thereafter, the image forming apparatus 100 outputs the basis weight corresponding to the calculated capacitance as the basis weight of the sheet S as the conveyance target on the basis of the correlation 95 defining the relationship between the capacitance of the sheet and the basis weight of the sheet.

By using not only the capacitance during sheet passing but also the capacitance during non-sheet passing, the image forming apparatus 100 can reduce the influence of the surrounding environmental variations. This allows the image forming apparatus 100 to accurately estimate the basis weight of the sheet S. With such a configuration, the image forming apparatus 100 can set the control parameters (e.g., sheet feeding speed, transfer voltage, and fixing temperature) related to printing on the basis of the accurately estimated basis weight of the sheet S, thereby improving the printing accuracy.

<Second Embodiment>

[Overview]

In the first embodiment, the capacitance detector 65 includes one capacitance sensor. In the second embodiment, by contrast, a capacitance detector 65 includes two capacitance sensors.

Other than this point, the image forming apparatus 100 according to the second embodiment is the same as the image forming apparatus 100 according to the first embodiment, and therefore the description thereof will not be repeated below.

[Capacitance Detector 65]

Figure 19:
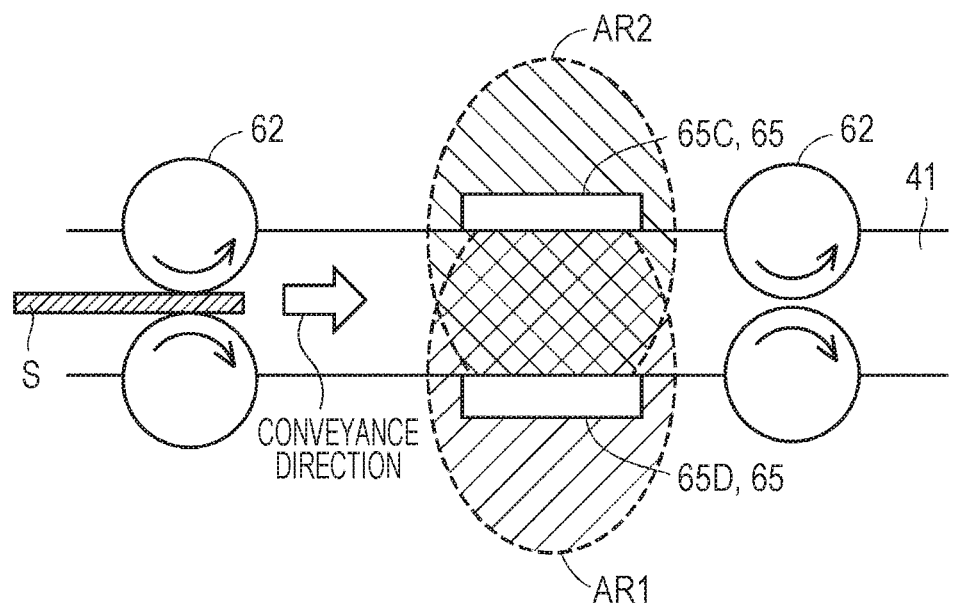
FIG. 19 is a view illustrating part of the conveyance path for the sheet.

The following describes the capacitance detector 65 according to the second embodiment with reference to FIG. 19. FIG. 19 is a view illustrating part of the conveyance path 41 for the sheet S.

The capacitance detector 65 according to the second embodiment includes two capacitance sensors 65C and 65D. The capacitance sensors 65C and 65D are arranged so as to face each other with the conveyance path 41 for the sheet S interposed therebetween. As an example, the circuit configuration of each of the capacitance sensors 65C and 65D is the same as the circuit configuration illustrated in FIG. 2 above. That is, each of the capacitance sensors 65C and 65D includes an electrode. Each electrode is arranged so as to face each other with the conveyance path 41 for the sheet S interposed therebetween.

The capacitance sensor 65C detects the capacitance in a detection region AR1. The capacitance sensor 65D detects the capacitance in a detection region AR2. The capacitance detector 65 detects the result of adding the capacitance detected by the capacitance sensor 65C and the capacitance detected by the capacitance sensor 65D as the detected capacitance. Since the capacitance sensors 65C and 65D are arranged so as to face each other with the conveyance path 41 interposed therebetween, the capacitance to be detected is less likely to vary even in a case where the sheet S being conveyed veers to one side of the conveyance path 41.

As more concrete processing, the capacitance detector 65 detects the result of adding the capacitance detected by the capacitance sensor 65C while the sheet S does not pass through the detection region AR1 and the capacitance detected by the capacitance sensor 65D while the sheet S does not pass through the detection region AR2 as the capacitance during non-sheet passing. The capacitance detector 65 also detects the result of adding the capacitance detected by the capacitance sensor 65C while the sheet S passes through the detection region AR1 and the capacitance detected by the capacitance sensor 65D while the sheet S passes through the detection region AR2 as the capacitance during sheet passing.

The image forming apparatus 100 calculates the value of difference between the capacitance during non-sheet passing and the capacitance during sheet passing. Thereafter, the image forming apparatus 100 refers to the above-described correlation 95 and identifies the basis weight corresponding to the difference value. The image forming apparatus 100 then detects this basis weight as the basis weight of the sheet S.

[Summary of Second Embodiment]

In the present embodiment, as described above, the capacitance sensors 65C and 65D are arranged so as to face each other with the conveyance path 41 for the sheet S interposed therebetween. The image forming apparatus 100 detects the basis weight of the sheet S on the basis of the result of adding the capacitance detected by the capacitance sensor 65C and the capacitance detected by the capacitance sensor 65D.

Since the capacitance sensors 65C and 65D are arranged so as to face each other with the conveyance path 41 for the sheet S interposed therebetween, the image forming apparatus 100 can stably detect the basis weight of the sheet S irrespective of the veering of the sheet S to one side of the conveyance path 41.

<Third Embodiment>

[Overview]

In the second embodiment, the two capacitance sensors 65C and 65D detect the capacitance each. In the third embodiment, by contrast, two capacitance sensors detect single capacitance.

Other than this point, the image forming apparatus 100 according to the third embodiment is the same as the image forming apparatus 100 according to the first embodiment and the second embodiment, and therefore the description thereof will not be repeated below.

[Capacitance Detector 65]

Figure 20:
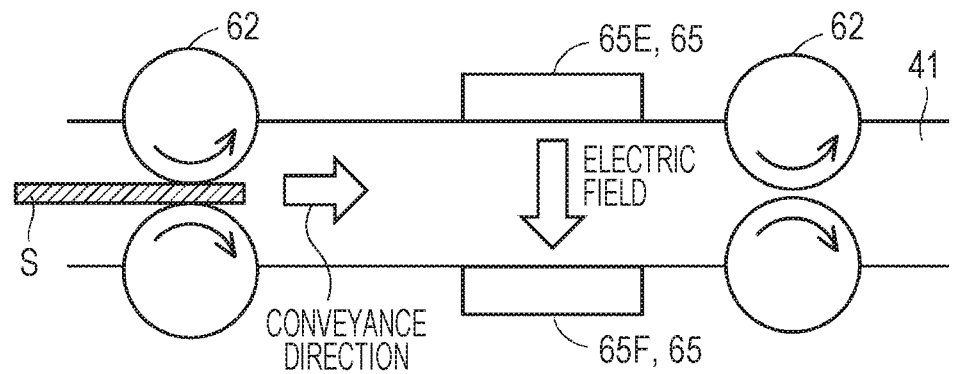
FIG. 20 is a view illustrating part of the conveyance path for the sheet.

The following describes a capacitance detector 65 according to the third embodiment with reference to FIG. 20. FIG. 20 is a view illustrating part of the conveyance path 41 for the sheet S.

The capacitance detector 65 according to the third embodiment includes two capacitance sensors 65E and 65F. The capacitance sensors 65E and 65F are arranged so as to face each other with the conveyance path 41 for the sheet S interposed therebetween. Typically, each of the capacitance sensors 65E and 65F includes an electrode. Each electrode is arranged so as to face each other with the conveyance path 41 for the sheet S interposed therebetween.

The image forming apparatus 100 applies a voltage between the capacitance sensors 65E and 65F (between the electrodes) to generate an electric field between the capacitance sensors 65E and 65F. The capacitance detector 65 detects the intensity of the generated electric field and calculates the capacitance between the capacitance sensors 65E and 65F on the basis of the detected electric field. Typically, a correlation between the intensity of the electric field and the intensity of the capacitance between the capacitance sensors 65E and 65F is preliminarily defined, and the capacitance detector 65 identifies the capacitance corresponding to the detected electric field by referring to this correlation.

The capacitance detector 65 detects the capacitance detected while the sheet S does not pass between the capacitance sensors 65E and 65F as the capacitance during non-sheet passing. The capacitance detector 65 also detects the capacitance detected while the sheet S passes between the capacitance sensors 65E and 65F as the capacitance during sheet passing. Thereafter, the image forming apparatus 100 calculates the value of difference between the capacitance during non-sheet passing and the capacitance during sheet passing. Subsequently, the image forming apparatus 100 refers to the above-described correlation 95 and identifies the basis weight corresponding to the difference value. The image forming apparatus 100 then detects this basis weight as the basis weight of the sheet S.

<Summary of Third Embodiment>

In the present embodiment, as described above, the capacitance sensors 65E and 65F are arranged so as to face each other with the conveyance path 41 for the sheet S interposed therebetween. The image forming apparatus 100 detects the electric field generated between the capacitance sensors 65E and 65F, and detects the capacitance between the capacitance sensors 65E and 65F on the basis of the intensity of the electric field.

Since the capacitance is detected from the intensity of the electric field between the capacitance sensors 65E and 65F, the capacitance detector 65 is less likely to be influenced by surrounding obstacles.

Although embodiments of the present invention have been described and illustrated in detail, it is clearly understood that the same is by way of illustration and example only and not limitation, the scope of the present invention should be interpreted by terms of the appended claims. All changes which fall within the meaning and scope equivalent to the appended claims are intended to be embraced within the scope of the present invention.

What is claimed is:

1. A sheet conveying apparatus capable of conveying a sheet as a conveyance target in a conveyance path, the sheet conveying apparatus comprising:
   a detector that detects a capacitance in a predetermined detection region in the conveyance path; and
   a basis weight identifier that identifies a basis weight of the sheet as the conveyance target based on a first capacitance detected by the detector during a first time interval while the sheet as the conveyance target does not pass through the detection region and a second capacitance detected by the detector during a second time interval while the sheet as the conveyance target passes through the detection region,
   wherein the detector includes a first capacitance sensor and a second capacitance sensor arranged so as to face each other with the conveyance path interposed between the first capacitance sensor and the second capacitance sensor, and detects, as the capacitance in the detection region, a result of adding a capacitance detected by the first capacitance sensor and a capacitance detected by the second capacitance sensor.

2. The sheet conveying apparatus according to claim 1, wherein the basis weight identifier acquires a third capacitance based on a difference between the first capacitance and the second capacitance, and identifies the basis weight of the sheet as the conveyance target based on a predetermined correlation between the capacitance and the basis weight of the sheet as well as the third capacitance.

3. The sheet conveying apparatus according to claim 1, wherein the detector acquires a width of the sheet in a conveyance direction of the sheet as the conveyance target and detects the second capacitance after a leading end of the sheet as the conveyance target reaches the detection region and a half of the width is further conveyed.

4. The sheet conveying apparatus according to claim 1, wherein the detector detects the first capacitance during a period between after conveyance of the sheet as the conveyance target is started and before the sheet as the conveyance target reaches the detection region.

5. The sheet conveying apparatus according to claim 4, wherein the detector detects the first capacitance at a timing when the conveyance of the sheet as the conveyance target is started.

6. The sheet conveying apparatus according to claim 1, further comprising:
a storage that stores the sheet; and
a sheet feeder that feeds the sheet from the storage to the conveyance path,
wherein the detector is provided within a predetermined range from the sheet feeder.

7. The sheet conveying apparatus according to claim 6, further comprising:
a sheet sensor that detects a state in which the sheet is placed in the storage,
wherein the detector detects the first capacitance while the sheet sensor detects the state.

8. The sheet conveying apparatus according to claim 6, further comprising:
a lift that lifts the sheet stored in the storage to the sheet feeder and guides the sheet to the conveyance path,
wherein the detector is arranged within a range in which detection result of the detector is influenced by guidance of the sheet by the lift.

9. The sheet conveying apparatus according to claim 8, wherein the detector detects the first capacitance during a period between after preparation processing for feeding the sheet as the conveyance target stored in the storage to the conveyance path is completed and before the sheet as the conveyance target reaches the detection region.

10. The sheet conveying apparatus according to claim 9, wherein the preparation processing includes processing in which the lift lifts the sheet stored in the storage to the sheet feeder.

11. The sheet conveying apparatus according to claim 10, wherein the detector detects the first capacitance based on reception of an instruction to feed the sheet stored in the storage to the conveyance path.

12. The sheet conveying apparatus according to claim 11, wherein the detector detects the first capacitance based on completion of the preparation processing after the reception of the instruction.

13. The sheet conveying apparatus according to claim 6, wherein the detector detects the first capacitance each time a predetermined number of sheets are fed from the storage to the conveyance path.

14. The sheet conveying apparatus according to claim 13, wherein the detector controls a value of the predetermined number of sheets in accordance with the basis weight of the sheet as the conveyance target identified by the basis weight identifier.

15. An image forming apparatus comprising:
the sheet conveying apparatus according to claim 1; and
an image former that forms an image on a sheet conveyed by the sheet conveying apparatus.

16. A sheet conveying apparatus capable of conveying a sheet as a conveyance target in a conveyance path, the sheet conveying apparatus comprising:
a detector that detects a capacitance in a predetermined detection region in the conveyance path; and
a basis weight identifier that identifies a basis weight of the sheet as the conveyance target based on a first capacitance detected by the detector during a first time interval while the sheet as the conveyance target does not pass through the detection region and a second capacitance detected by the detector during a second time interval while the sheet as the conveyance target passes through the detection region,
wherein the basis weight identifier acquires a third capacitance based on a ratio of the second capacitance to the first capacitance, and identifies the basis weight of the sheet as the conveyance target based on a predetermined correlation between the capacitance and the basis weight of the sheet as well as the third capacitance.

17. The sheet conveying apparatus according to claim 16, wherein the detector includes a first capacitance sensor and a second capacitance sensor arranged so as to face each other with the conveyance path interposed between the first capacitance sensor and the second capacitance sensor, and detects an electric field generated between the first capacitance sensor and the second capacitance sensor to detect the capacitance in the detection region based on the detected electric field.

18. An estimation method for estimating a basis weight of a sheet as a conveyance target being conveyed in a conveyance path, the estimation method comprising:
detecting a capacitance in a predetermined detection region in the conveyance path; and
identifying the basis weight of the sheet as the conveyance target based on a first capacitance detected through the capacitance detection during a first time interval while the sheet as the conveyance target does not pass through the detection region and a second capacitance detected through the capacitance detection during a second time interval while the sheet as the conveyance target passes through the detection region,
wherein the capacitance detection is performed using a first capacitance sensor and a second capacitance sensor arranged so as to face each other with the conveyance path interposed between the first capacitance sensor and the second capacitance sensor, and the capacitance detection detects, as the capacitance in the detection region, a result of adding a capacitance detected by the first capacitance sensor and a capacitance detected by the second capacitance sensor.

19. A non-transitory recording medium storing a computer readable estimation program causing a computer to estimate a basis weight of a sheet as a conveyance target being conveyed in a conveyance path, the estimation program causing the computer to execute:
detecting a capacitance in a predetermined detection region in the conveyance path; and
identifying the basis weight of the sheet as the conveyance target based on a first capacitance detected through the capacitance detection during a first time interval while the sheet as the conveyance target does not pass through the detection region and a second capacitance detected through the capacitance detection during a second time interval while the sheet as the conveyance target passes through the detection region,
wherein the capacitance detection is performed using a first capacitance sensor and a second capacitance sensor arranged so as to face each other with the conveyance path interposed between the first capacitance sensor and the second capacitance sensor, and the capacitance detection detects, as the capacitance in the detection region, a result of adding a capacitance detected by the first capacitance sensor and a capacitance detected by the second capacitance sensor.

20. An estimation method for estimating a basis weight of a sheet as a conveyance target being conveyed in a conveyance path, the estimation method comprising:

detecting a capacitance in a predetermined detection region in the conveyance path; and identifying the basis weight of the sheet as the conveyance target based on a first capacitance detected through the capacitance detection during a first time interval while the sheet as the conveyance target does not pass through the detection region and a second capacitance detected through the capacitance detection during a second time interval while the sheet as the conveyance target passes through the detection region, wherein identifying the basis weight comprises acquiring a third capacitance based on a ratio of the second capacitance to the first capacitance, and identifying the basis weight of the sheet as the conveyance target based on a predetermined correlation between the capacitance and the basis weight of the sheet as well as the third capacitance.

21. A non-transitory recording medium storing a computer readable estimation program causing a computer to estimate a basis weight of a sheet as a conveyance target being conveyed in a conveyance path, the estimation program causing the computer to execute:

detecting a capacitance in a predetermined detection region in the conveyance path; and identifying the basis weight of the sheet as the conveyance target based on a first capacitance detected through the capacitance detection during a first time interval while the sheet as the conveyance target does not pass through the detection region and a second capacitance detected through the capacitance detection during a second time interval while the sheet as the conveyance target passes through the detection region, wherein identifying the basis weight comprises acquiring a third capacitance based on a ratio of the second capacitance to the first capacitance, and identifying the basis weight of the sheet as the conveyance target based on a predetermined correlation between the capacitance and the basis weight of the sheet as well as the third capacitance.

\* \* \* \* \*